US007613361B2

(12) United States Patent
Anabuki et al.

(10) Patent No.: US 7,613,361 B2
(45) Date of Patent: Nov. 3, 2009

(54) INFORMATION PROCESSING METHOD AND DEVICE

(75) Inventors: Mahoro Anabuki, Cambridge, MA (US); Kiyohide Satoh, Kawasaki (JP); Shinichi Aratani, Yokohama (JP); Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 11/127,000

(22) Filed: May 11, 2005

(65) Prior Publication Data

US 2005/0256395 A1    Nov. 17, 2005

(30) Foreign Application Priority Data

| May 14, 2004 | (JP) | ............................. 2004-144784 |
| May 14, 2004 | (JP) | ............................. 2004-144895 |
| Nov. 4, 2004 | (JP) | ............................. 2004-320637 |
| Mar. 9, 2005 | (JP) | ............................. 2005-065356 |

(51) Int. Cl.
*G06K 9/36* (2006.01)
*G06K 9/32* (2006.01)
*G06K 9/00* (2006.01)

(52) U.S. Cl. ....................... 382/287; 382/103; 382/291; 382/295

(58) Field of Classification Search ................. 382/187, 382/103, 287, 154, 276, 291, 295; 600/414; 345/633, 629
See application file for complete search history.

(56) References Cited

U.S. PATENT DOCUMENTS 5,745,126 A * 4/1998 Jain et al. ................... 382/154
2004/0176925 A1   9/2004 Satoh

OTHER PUBLICATIONS

Satoh et al., "Robust Vision-Based Registration Utilizing Bird's-Eye View with User's View", 2003, Proceedings of the 2nd IEEE/ACM International Symposium on Mixed and Augmented Reality, pp. 46-55.*
Haralick, et al.,"Review and analysis of solutions of the three point perspective pose . . . ", International Journal of Computer Vision, vol. 13, No. 3, pp. 331-356, 1994.
Lowe, "Fitting parameterized three-dimensional models to images", IEEE Transactions on PAMI, vol. 13, No. 5, pp. 441 to 450, 1991.

(Continued)

*Primary Examiner*—John B Strege
(74) *Attorney, Agent, or Firm*—Canon U.S.A. Inc., I.P. Division

(57) ABSTRACT

An information processing device for obtaining placement information regarding an imaging device of markers to be calibrated that are provided upon the imaging device, includes: a first image obtaining unit adapted to obtain a first image photographed with the imaging device; a second image obtaining unit adapted to obtain a second image obtained by photographing the imaging device from a bird's-eye view position; a first detecting unit adapted to detect information relating to image coordinates of reference markers placed in a scene, from the first image; a second detecting unit adapted to detect information relating to image coordinates of markers to be calibrated from the second image; and a calibration information calculating unit adapted to obtain the calibration information using information relating to image coordinates of the reference markers detected by the first detecting unit and the second detecting unit.

13 Claims, 9 Drawing Sheets

OTHER PUBLICATIONS

A. I. Comport, et al., "A real-time tracker for markerless augmented reality", Proc. Int'l Symp. On Mixed and Augmented Reality 2003, pp. 36-45, 2004.

Fujii, et al., "Positioning by stereo camera with concomitant . . .", Info. & Commun. Engineers PRMU 99-192 (Tech. Report of IEICE vol. 99, No. 574, pp. 1-8), 1999.

K. Satoh, et, al., "Robust vision-based registration utilizing bird's-eye view . . .",Proc. 2nd IEEE/ACM, ISMAR 2003, pp. 46-55, Oct. 2003.

Uchiyama, et al., "A Robust Registration Method for Merging Real and Virtual Worlds . . .", TVRSJ vol. 8 No. 1 pp. 119-125, 2003.

* cited by examiner

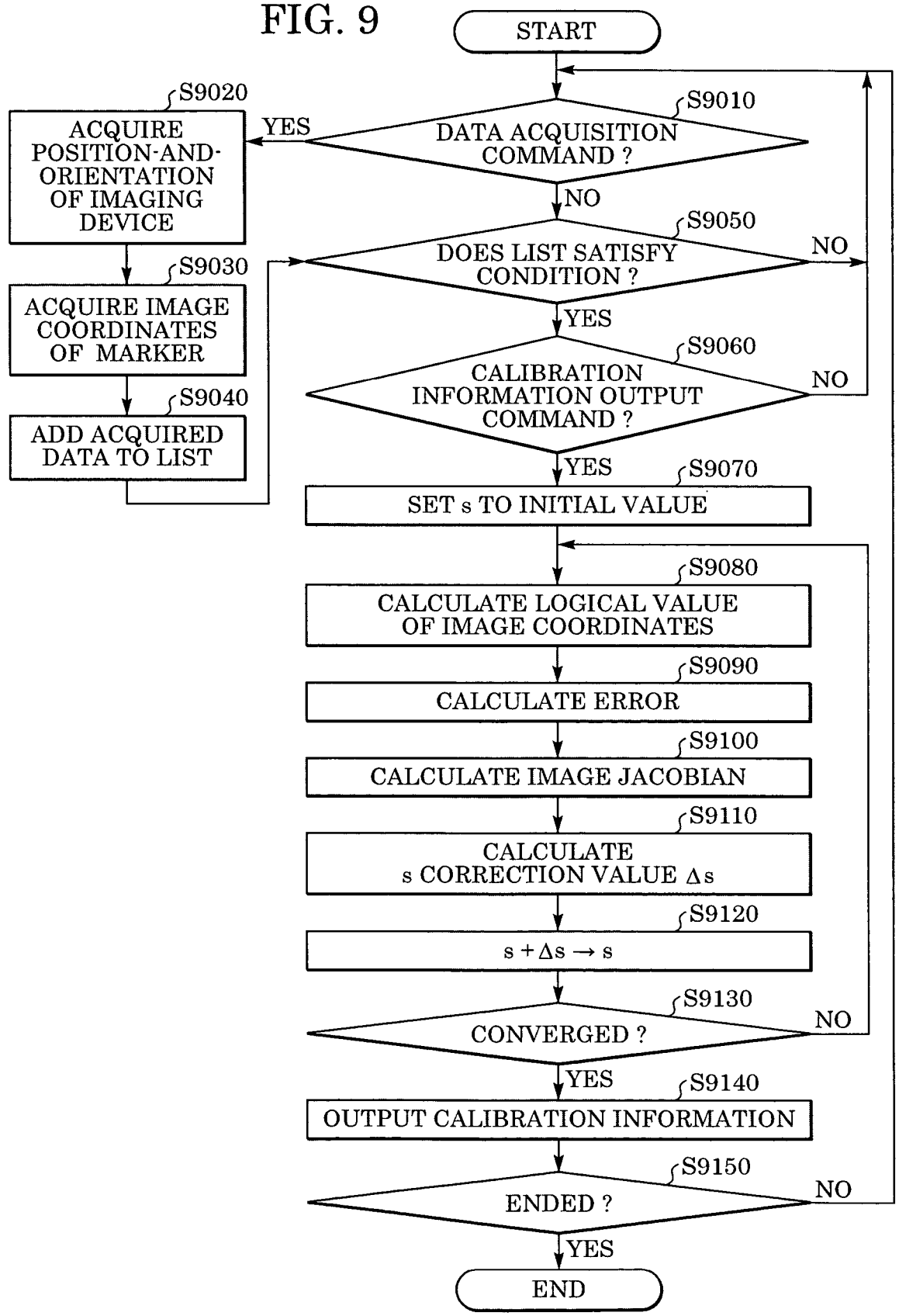

INFORMATION PROCESSING METHOD AND DEVICE

BACKGROUND OF THE INVENTION

1. Field of the Invention

The present invention relates to calibrating placement information of markers, provided on an imaging device, as to the imaging device.

2. Description of the Related Art

In recent years, studies regarding Mixed Reality, which aims to seamlessly join real space and virtual space, have been actively pursued. An image display device for presenting this Mixed Reality is realized by a video see-through method for displaying a synthesized image obtained by superimposing and drawing an image in virtual space (a virtual object, character information, or the like, drawn with computer graphics) generated according to the position and orientation of a later-described imaging device over an image in real space photographed using an imaging device such as a video camera.

There are expectations for application of such image display devices to various fields unlike those for conventional virtual reality, such as surgical aids for superimposing and displaying the situation within a patient's body over the patient's body surface, Mixed Reality games where a player would battle with a virtual enemy in real space, and so forth.

The most important problem to be solved for all such applications is how to accurately perform the registration between real space and virtual space, and heretofore, many measures have been attempted. The registration problem in Mixed Reality is concluded in the problem of obtaining the position and orientation of an imaging device in a scene (i.e., in the world coordinates system).

A commonly-employed method for solving this problem is to dispose or set multiple markers in the scene, and use the coordinates of the markers in the world coordinates system, and the coordinates of the projected images of the markers within an image photographed by an imaging device, so as to obtain the position and orientation of the imaging device in the scene. A method for calculating the position and orientation of an imaging device based on a pair of the coordinates in the world coordinates system of a marker in a scene and image coordinates of a projected image thereof has been proposed in the field of photographic measurement as of old.

Also, technology has been realized in which the position and orientation of an object is obtained by setting multiple markers with regard to an object to be measured, photographing the object with an externally disposed bird's-eye view camera, and detecting the image coordinates of the projected images of the markers within the taken bird's-eye view image (see R. M. Haralick, C. Lee, K. Ottenberg, and M. Nolle: "Review and analysis of solutions of the three point perspective pose estimation problem", Int'l. J. Computer Vision, Vol. 13, No. 3, pp. 331-356, 1994; and D. G. Lowe: "Fitting parameterized three-dimensional models to images", IEEE translations on PAMI, Vol. 13, No. 5, pp. 441-450, 1991).

Further, the present inventors have also proposed in US Published Patent Application No. 20040176925 (filed in the USPTO on Jan. 8, 2004) a measurement method for the position and orientation of an imaging device, which integrates: a method for calculating the position and orientation of an imaging device by detecting projected images of markers within a scene, from an image which the imaging device, to be measured itself, has taken; and a method for calculating the position and orientation of an imaging device by detecting projected images of markers set upon the imaging device itself, from a bird's-eye view image taken of the object to be measured from a bird's-eye view position.

However, with the method for calculating the position and orientation of an imaging device by detecting image coordinates of projected images of markers within a bird's-eye view image, the relative positional relation between the multiple makers set upon the object to be measured, and the object to be measured, must be known. In the event that the relative positional relation of each of the markers is unknown, e.g., in the event that markers of which the features can be described as a single point are each placed upon the object to be measured, such as with a case of utilizing the center-of-gravity position of projected images of a markers as features using colored spherical markers or circular markers, the three-dimensional position of each of the markers in the coordinate system of the object to be measured must be measured beforehand. On the other hand, in the event that the relative positional relation between the markers is known, such as with a case of the markers (even if markers such as described above are used) having been mounted to a jig serving as a base beforehand, the positions of each of the markers on the coordinate system of this jig (hereafter, a coordinates system for describing the relative position of markers in this way is referred to as "marker coordinate system") having been measured beforehand, and the jig having been mounted to the object to be measured, all that is necessary is for the position and the orientation for this jig in the coordinate system of the object to be measured to be known. It should be noted that in the event that the features of the markers are described with multiple points, e.g., in the event of using the vertices of the projected images of markers having known shapes such as squares or triangles, for example, as features, each marker is interpreted as being a group of multiple markers, and is taken as being a case wherein "the relative positional relation between markers is known". However, no method for accurately calibrating these is commonly known, and conventionally, there has been no other way but to use the inaccurate position or position and orientation obtained by manual measurement as known values. Accordingly, there is room for improvement in the above-described method for detecting the position and orientation of an object by measuring image coordinates of projected images of markers within a bird's-eye view image, in that the position and orientation of the object could only be measured with low precision from a practical standpoint.

SUMMARY OF THE INVENTION

The present invention has been made in light of the above-described problems, and accordingly the present invention provides for easily and accurately obtaining marker placement information regarding an object. To this end, the present invention is configured as follows.

According to a first aspect of the present invention, an information processing method for calculating a position of a marker provided upon an object, as to the object, includes: an object position-and-orientation obtaining step for obtaining position and orientation information of the object; a first image input step for inputting a first image from a bird's-eye view imaging unit, photographed from bird's-eye view of the object; a detecting step for detecting the marker from the first image; and a marker position-and-orientation calculating step for calculating the position of the marker with the object as a reference using the position and orientation of the object and information relating to detected marker image coordinates.

Other features and advantages of the present invention will become apparent from the following description of exemplary embodiments taken in conjunction with the accompanying drawings, in which like reference characters designate the same or similar parts throughout the figures thereof.

BRIEF DESCRIPTION OF THE DRAWINGS

FIG. 9 is a flowchart illustrating a process of the marker calibration method according to the fourth embodiment.

DESCRIPTION OF THE EMBODIMENTS

The following is a detailed description of embodiments of the present invention, with reference to the accompanying drawings.

First Embodiment

The marker calibration device according to the present embodiment obtains the position of markers provided upon an imaging device, as to the imaging device, for each marker. The following is a description of the marker calibration device and marker calibration method according to the present embodiment.

Figure 1:
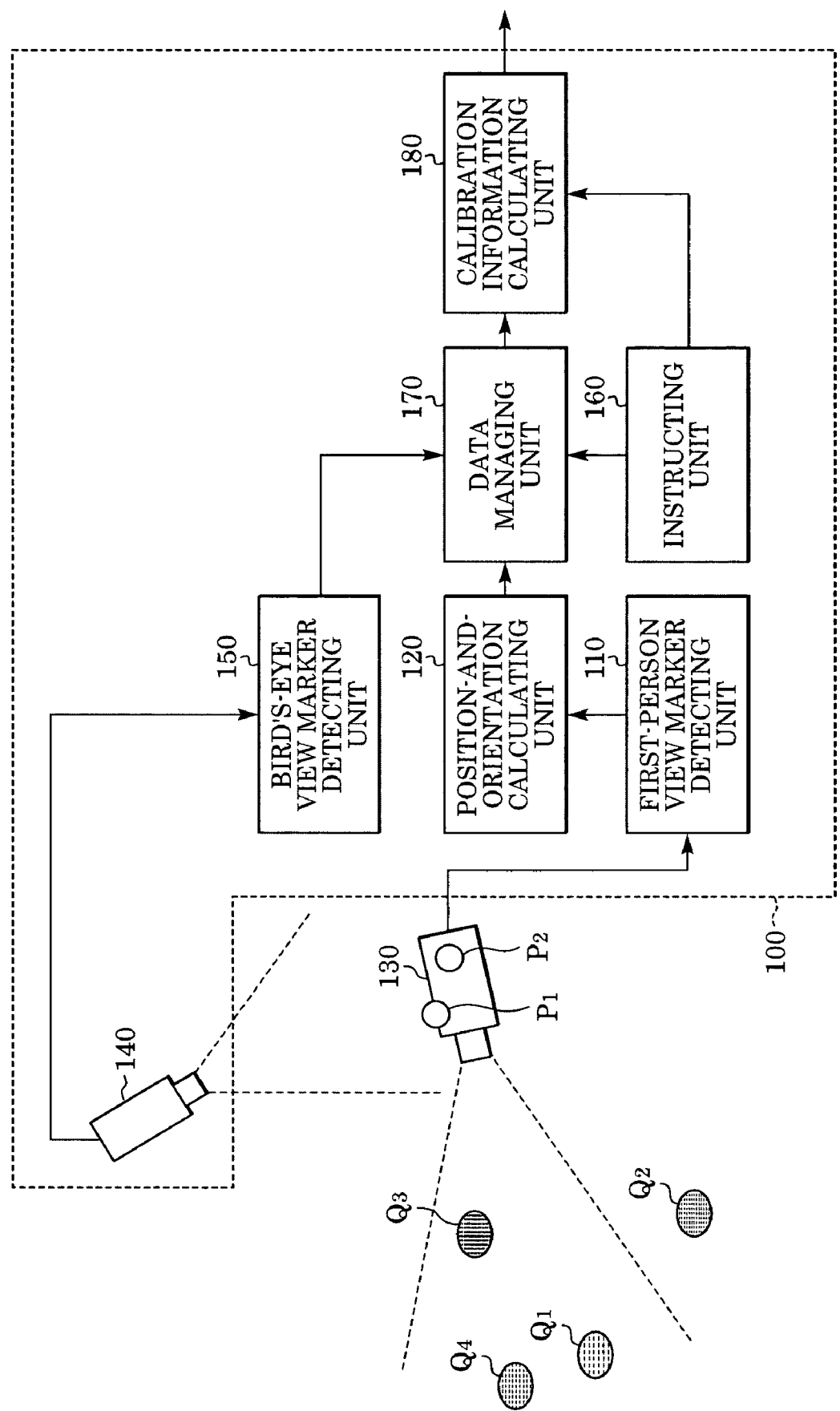
FIG. 1 is a diagram illustrating a configuration of a marker calibration device according to a first embodiment of the present invention.

FIG. 1 is a diagram illustrating an exemplary configuration of a marker calibration device 100 according to a first embodiment of the present invention. As shown in FIG. 1, the marker calibration device 100 includes a first-person view marker detecting unit 110, a position-and-orientation calculating unit 120, a bird's-eye view marker detecting unit 150, an instructing unit 160, a data managing unit 170, and a calibration information calculating unit 180, and is connected to the imaging device 130 which is to be calibrated.

This description will proceed with the understanding that the user of the marker calibration device 100 according to the present embodiment sets one or more markers $P_k$ (wherein k=1 up to $K_2$) to be calibrated (hereafter referred to as "bird's-eye view marker"). The position of a bird's-eye view marker in a first-person view camera coordinate system (a coordinate system in which a point on the imaging device 130 is defined as a point of origin, and further, three orthogonal axes are defined each as the X-axis, Y-axis, and Z-axis) is unknown, and the unknown position of the bird's-eye view marker in the bird's-eye view camera coordinate system is the information to be calibrated by the marker calibrating device according to the present embodiment, i.e., the output of the marker calibration of the marker calibrating device according to the present embodiment.

Disposed in multiple points in real space are multiple first-person view markers $Q_k$ (wherein k=1 up through $K_1$) having known positions in the world space coordinate system (a coordinate system in which a point in real space is defined as a point of origin, and further, three orthogonal axes are defined each as the X-axis, Y-axis, and Z-axis), as markers for photographing with the imaging device 130 (hereafter referred to as first-person view markers (reference markers)). First-person view markers $Q_k$ are preferably placed so that at least three or more markers are observed by the imaging device 130 at the time of obtaining data for marker calibration. With the example shown in FIG. 1, four first-person view markers $Q_1$, $Q_2$, $Q_3$, and $Q_4$, are placed, and of these, three view markers $Q_1$, $Q_3$, and $Q_4$, are situated within the field of view of the imaging device 130.

The first-person view markers $Q_k$ may be circular markers each with different colors, or may be configured of features points such as natural features each having different texture features. Also, square markers formed having a square region with a certain degree of area may be used. In fact, any kind of markers may be used as long as image coordinates in a projected image on a photographed image can be detected, and also identification can be made regarding which marker is which.

An image output from the imaging device 130 (hereafter referred to as a "first-person view image") is input to the first-person view marker detecting unit 110. The first-person view marker detecting unit 110 inputs the first-person view image from the imaging device 130, and detects the image coordinates of the first-person view markers $Q_k$ taken in the input image. For example, in the event that the first-person view markers $Q_k$ are each configured of different-colored markers, regions corresponding to each marker color on the first-person view image are detected, and the center-of-gravity position thereof is taken as the detection coordinates of the marker. Also, in the event that the first-person view markers $Q_k$ are each configured of feature points having different texture features, the position of the markers are detected by subjecting the first-person view image to template matching using template images of each of the markers, held beforehand as known information. In the event that a square marker is to be used as a reference marker, the image is subjected to binarization processing and then labeling, and regions having a certain area or greater which are formed from four straight lines are detected as marker candidates. Further, erroneous detection is eliminated by determining whether or not there is a particular pattern within the candidate region, thus obtaining the direction and identifier of the marker. A square marker thus detected can be considered to be four markers formed of each of four vertices.

Further, the first-person view marker detecting unit 110 outputs the image coordinates $u^{Qkn}$ and the identifier thereof $k_n$ for each of the detected first-person view markers $Q_{kn}$ to the position-and-orientation calculating unit 120. Now, n (n=1 on up to N) is an index for each of the markers that have been detected, and N represents the total number of markers that have been detected. For example, in the case shown in FIG. 1, N=3, so the identifiers $k_1=1$, $k_2=3$, and $k_3=4$, and the corresponding image coordinates $u^{Qk1}$, $u^{Qk2}$, and $u^{Qk3}$, are output. In the present embodiment, the first-person view marker detecting unit 110 continuously performs the marker detection processing taking input of an image from the imaging device 130 as a trigger, but an arrangement may be made in which processing is performed in accordance with a request from the position-and-orientation calculating unit 120 (using the first-person view image input at that point).

The position-and-orientation calculating unit 120 calculates the position and orientation of the imaging device 130, based on the correlation between the image coordinates $u^{Qkn}$ of each of the detected first-person view markers $Q_{kn}$, and the world coordinates $x_w^{Qkn}$ held beforehand as known information. The method for calculating the position and orientation of an imaging device from the pair of world coordinates and image coordinates of a first-person view marker has been known (see R. M. Haralick, C. Lee, K. Ottenberg, and M. Nolle: "Review and analysis of solutions of the three point perspective pose estimation problem", Int'l. J. Computer Vision, Vol. 13, No. 3, pp. 331-356, 1994; and D. G. Lowe: "Fitting parameterized three-dimensional models to images", IEEE translations on PAMI, Vol. 13, No. 5, pp. 441-450, 1991). For example, in the event that the first-person view markers are placed on the same plane, detecting four or more markers allows the position and orientation of the imaging device to be detected by two-dimensional homographic calculations. Also, a method for detecting the position and orientation of the imaging device using six or more markers not on the same plane is well known. Further, methods for optimizing the estimation values of position and orientation by minimizing error between the logical values of the image coordinates of markers calculated from estimation values of the position and orientation of the imaging device, by repetitive calculation such as the Gauss-Newton method using an image Jacobian. The position and orientation of the imaging device 130 in the world coordinate system thus calculated is output to the data managing unit 170 in accordance with a request from the data managing unit 170. While the present embodiment involves the position-and-orientation calculating unit 120 continuously performing the calculation of the position and orientation taking input of the data from the first-person view marker detecting unit 110 as a trigger, an arrangement may be made in which the processing is performed in response to a request from the data managing unit 170 (using the input data at that point). In the following description, the position and orientation of the imaging device 130 is to be understood to be held as a 4×4 homogeneous coordinates matrix $M_{WC}$ (modeling conversion matrix; a matrix for converting coordinates in the first-person view camera coordinate system into coordinates in the world coordinate system).

The bird's-eye view camera 140 is fixed and positioned at a position capable of taking the imaging device 130 when obtaining data for marker correction. The position and orientation of the bird's-eye view camera 140 in the world coordinates are to be held in the calibration information calculating unit 180 beforehand as known values. Hereinafter, we use a term "bird's-eye view camera" to indicate the camera that observes the target from a third-persons viewpoint; the position of the camera is not limited to the "bird's-eye" position.

The bird's-eye view marker detecting unit 150 inputs an image photographed by the bird's-eye view camera 140 (bird's-eye view image), detects image coordinates of a bird's-eye view marker $P_k$ taken in the image by processing similar to that of the first-person view marker detecting unit 110, and outputs to the data managing unit 170 the image coordinates $u^{Qkm}$ and the identifier thereof $k_m$ detected according to the request of the data managing unit 170. Now, m (m=1 on up to M) is an index for each of the markers that have been detected, and M represents the total number of markers that have been detected. For example, in the case shown in FIG. 1, M=2, so the identifiers $k_1$=1 and $k_2$=2, and the corresponding image coordinates $u^{Pk1}$ and $u^{Pk2}$, are output. In the present embodiment, the bird's-eye view marker detecting unit 150 continuously performs the marker detection processing taking input of a bird's-eye view image as a trigger, but an arrangement may be made in which processing is performed in accordance with a request from the data managing unit 170 (using the bird's-eye view image input at that point).

In the event that a data obtaining command is input from an operator (not shown), the instructing unit 160 transmits an "obtain data" instruction to the data managing unit 170, and in the event that a calibration information calculation command is input, transmits a "calibration information calculation" instruction to the calibration information calculating unit 180. Input of commands to the instructing unit 160 can be made by pressing keys to which certain commands have been assigned, using a keyboard, for example, or using a GUI displayed on a display.

Upon the data managing unit 170 receiving an "obtain data" instruction from the instructing unit 160, the position and orientation of the imaging device 130 in the world coordinate system is input from the position-and-orientation calculating unit 120, the image coordinates of the bird's-eye view markers and the identifiers thereof are input from the bird's-eye view marker detecting unit 150, and the pair of "position and orientation of imaging unit 130 and image coordinates of bird's-eye view markers" is added to and held in a data list prepared for each identifier of the bird's-eye view markers. Now, the position and orientation of the imaging device 130 in the world coordinate system input from the position-and-orientation calculating unit 120 is data obtained at the same time as the time of photographing the image from which the image coordinates of the bird's-eye view markers have been detected, input from the bird's-eye view marker detecting unit 150. Also, the data managing unit 170 outputs a data list for each bird's-eye view marker generated to the calibration information calculating unit 180, in response to a request from the calibration information calculating unit 180.

Upon the calibration information calculating unit 180 receiving a "calibration information calculation" from the instructing unit 160, a data list is input for the data managing unit 170, calibration processing is performed based thereupon, and calibration information obtained as the result thereof (i.e., the position of each bird's-eye view marker in the first-person view camera coordinate system) is output.

Figure 2:
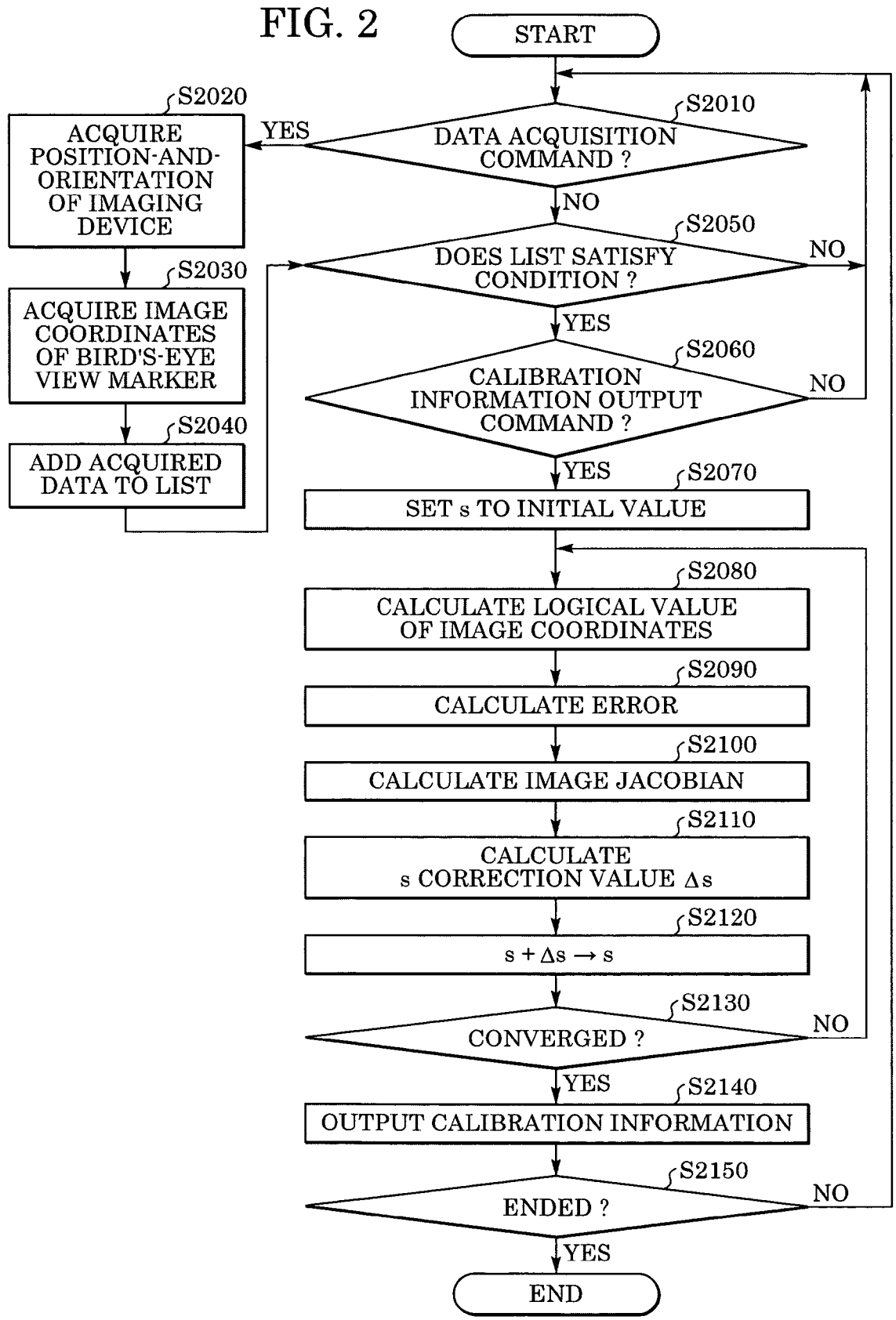
FIG. 2 is a flowchart illustrating a process of a marker calibration method according to the first embodiment.

FIG. 2 is a flowchart illustrating processing performed at the time of the calibration device obtaining calibration information according to the present embodiment. Program code according to the flowchart is stored in memory within the device according to the present embodiment, such as random access memory (RAM), read-only memory (ROM), or the like (not shown), which is then read out by a central processing unit (CPU) (not shown) and executed.

First, in step S2010, the instructing unit 160 determines whether or not a data obtaining command has been input from the operator. The operator inputs a data obtaining command upon the imaging device 130 being placed at a position for obtaining marker calibration data. If it is determined that a data obtaining command has not been input (no in step S2010), the instructing unit 160 advances the processing to step S2050. If it is determined that a data obtaining command has been input (yes in step S2010), the instructing unit 160 advances the processing to step S2020.

In step S2020, the data managing unit 170 inputs the position and orientation $M_{WC}$ of the imaging device 130 in the world coordinate system, from the position-and-orientation calculating unit 120.

In step S2030, the data managing unit 170 inputs, from the bird's-eye view marker detecting unit 150, the image coordinates $u^{Pkm}$ of the bird's-eye view markers $P_{km}$ detected by the bird's-eye view marker detecting unit 150 and the identifiers $k_m$ thereof. According to the processing performed in these steps S2020 and S2030, the image coordinates of the bird's-eye view markers in a case that the position and orientation of the imaging device 130 is $M_{WC}$. Note that the information input from the bird's-eye view marker detecting unit 150 does not necessarily need to be information relating to all bird's-eye view markers, and that information relating to markers detected on the bird's-eye view image at that point in time is sufficient.

Next, in step S2040, the data managing unit 170 adds the input data pair to the data list $L^{Pk}$ for each detected bird's-eye view marker $P_{km}$ that is detected. Specifically, with the $M_{WC}$ input from the position-and-orientation calculating unit 120 as $M_{WCi}$, and the $u^{Pkm}$ input from the bird's-eye view marker detecting unit 150 as $u_i^{Pk}$, the pairs of $[M_{WCi}, u_i^{Pk}]$ are registered in the data list $L^{Pk}$ regarding the bird's-eye view marker $P_k$ as i'th data relating to $P_k$, these pairs being sorted by the identifiers $k_m$ input from the bird's-eye view marker detecting unit 150. Note that i (i=1 on up to $I^{Pk}$) is an index for each of the pairs registered in the data list $L^{Pk}$, and $I^{Pk}$ represents the total number of pairs that have been registered with regard to the bird's-eye view marker $P_k$. Thus, data is obtained.

In step S2050, data lists regarding all bird's-eye view markers obtained so far by the data managing unit 170, or data lists regarding at least one bird's-eye view marker, are subjected to determination regarding whether or not the data list is sufficient for calculating calibration information. In the event that at least one data list or all data lists are found to not satisfy the conditions, the flow returns to step S2010, and awaits input of a data obtaining command. On the other hand, in the event that at least one data list or all data lists are found to satisfy the conditions for calibration information calculation, the flow proceeds to step S2060. An example of a condition for a data list regarding a certain bird's-eye view marker $P_k$ satisfying the conditions for calibration information calculation is for the data list $L^{Pk}$ to have obtained two or more different pairs of data $[M_{WCi}, u_i^{Pk}]$. As described later, two equations are obtained from a single pair of data (see Expression 3), so if two or more pairs of data have been obtained, the position of the bird's-eye view marker in the first-person view camera coordinate system, which involves three parameters, can be obtained from the four equations. However, the greater the diversity is in the input data, the higher the precision is of the yielded calibration information, so arrangements may be made in which conditions are set to request a greater amount of data.

Next, in step S2060, determination is made regarding whether or not a calibration information calculation command has been input from the operator. In the event that a calibration information calculation command has been input, the processing advances to step S2070, while in the event that a calibration information calculation command has not been input, the flow returns to step S2010 and awaits input of a data obtaining command.

The calibration information calculating unit 180 handles the calibration information to be obtained, i.e., the position of the bird's-eye view marker in the first-person view camera coordinate system, as a three-valued vector $[x_C y_C z_C]^T$. In the following description, this unknown parameter will be described as state vector $s^{Pk}=[x_C^{Pk} y_C^{Pk} z_C^{Pk}]^T$. Now description will continue with regard to processing on a certain bird's-eye view marker $P_k$; however, it should be understood that processing is carried out in common with regard to all bird's-eye view markers in a data list that have satisfied calibration information calculation conditions.

In step S2070, the calibration information calculating unit 180 gives the state vector $s^{Pk}$ a suitable initial value (e.g., $[000]^T$).

In step S2080, the calibration information calculating unit 180 calculates the logical value $u_i^{Pk}=[u_{xi}^{Pk}, u_{yi}^{Pk}]$ of the bird's-eye view image coordinates of the bird's-eye view marker $P_k$ for all i's, based on each data set $[M_{WCi}, u_i^{Pk}]$ (where i=1 on up to $I^{Pk}$) in the data list $L^{Pk}$. Note that here, the logical value of the bird's-eye view image coordinates of the bird's-eye view marker means data for the position (coordinates) in the bird's-eye view image at which the bird's-eye view marker $P_k$, regarding which the position in the first-person view camera coordinate system have been yielded, should be visible. Calculation of $u_i^{Pk}$, is performed based on the function-shown in Expression 1.

$$u_i^{Pk'}=F_i(s^{Pk}) \quad (1)$$

Expression 1 represents the position of the bird's-eye view marker $P_k$ in the first-person view camera coordinates system.

Specifically, the function $F_i(\ )$ is configured as shown in Expression 2.

$$x_{B_i}^{Pk}=[x_{B_i}^{Pk} y_{B_i}^{Pk} z_{B_i}^{Pk} 1]^T = M_{WB}^{-1} \cdot M_{WCi} \cdot [x_C^{Pk} y_C^{Pk} z_C^{Pk} 1]^T \quad (2)$$

Expression 2 is used for obtaining the position vector $x_{Bi}^{Pk}$ of the bird's-eye view marker $P_k$ in the bird's-eye view camera coordinates at the point of having obtained an i'th data set (i.e., at the point that the position and orientation of the imaging device 130 is $M_{WCi}$) from $s^{Pk}$, and Expression 3.

$$u_i^{Pk'} = \left[ u_{xi}^{Pk'} u_{yi}^{Pk'} \right]^T = \left[ -f_x^B \frac{x_{B_i}^{Pk}}{z_{B_i}^{Pk}} -f_y^B \frac{y_{B_i}^{Pk}}{z_{B_i}^{Pk}} \right]^T \quad (3)$$

Expression 3 is used for obtaining the coordinates $u_i^{Pk}$ of the bird's-eye view marker $P_k$ in the bird's-eye view camera image from $x_{Bi}^{Pk}$. Note that here, $f_x^B$ and $f_y^B$ denote the focal distance of the bird's-eye view camera 140 in the x-axial direction and the y-axial direction, respectively, and are to be understood to be known values held beforehand. Also, $M_{WB}$ is a conversion matrix for converting coordinates in the bird's-eye view camera coordinates system into world coordinates, and is calculated beforehand, based on the position and orientation of the bird's-eye view camera 140 in the world coordinate system, held as known values beforehand.

In step S2090, the calibration information calculating unit 180 calculates the error $\Delta u_i^{Pk}$ between the actual image coordinates $u_i^{Pk}$ of bird's-eye view markers $P_k$ contained in each data set in the data list $L^{Pk}$ and the corresponding image coordinates logical value $u_i^{Pk}$, for all i's, using Expression 4.

$$\Delta u_i^{Pk}=u_i^{Pk}-u_i^{Pk'} \quad (4)$$

In step S2100, the calibration information calculating unit 180 calculates the image Jacobian $J_{uis}^{Pk}(=\partial u_i^{Pk}/\partial s^{Pk})$ regarding the state vector $s^{P_k}$ (i.e., a 2-row×3-column Jacobian matrix having for the components thereof the solutions obtained by partial differentiation of the function $F_i$ in Expression 1 with the components of the state vector $s^{P_k}$), for all i's. Specifically, a 2-row×3-column Jacobian matrix $J_{u_iB_i}^{P_k}$ ($=\partial u_i^{P_k}/\partial x_{Bi}^{P_k}$) having for the components thereof the solutions obtained by partial differentiation of the right side of Expression 3 with the components of the position vector $x_{Bi}^{P_k}$, and a 3-row×3-column Jacobian matrix $J_{xBis}^{P_k}$ ($=\partial x_{Bi}^{P_k}/\partial s^{P_k}$) having for the components thereof the solutions obtained by partial differentiation of the right side of Expression 2 with the components of the state vector $s^{P_k}$, are calculated, and $J_{uis}^{P_k}$ is calculated using Expression 5.

$$J_{u_is}^{P_k}=J_{u_ix_{Bi}}^{P_k} \cdot J_{x_{Bi}s}^{P_k} \tag{5}$$

In step S2110, the calibration information calculating unit 180 calculates a correction value $\Delta s^{P_k}$ based on the error $\Delta_i^{P_k}$ and the Jacobian matrices $J_{uis}^{P_k}$ calculated above for all i's. Specifically, an error vector of a $2I^{P_k}$ dimension vector vertically giving errors $\Delta u_i^{P_k}$ for all i's as shown in Expression 6.

$$U = \begin{bmatrix} \Delta u_1^{P_k} \\ \Delta u_2^{P_k} \\ \vdots \\ \Delta u_{I^{P_k}}^{P_k} \end{bmatrix} \tag{6}$$

A $2I^{P_k}$ row×3 column matrix vertically giving the Jacobian matrices $J_{uis}^{P_k}$ is also created as shown in Expression 7.

$$\Phi = \begin{bmatrix} J_{u_1s}^{P_k} \\ J_{u_2s}^{P_k} \\ \vdots \\ J_{u_{I^{P_k}}s}^{P_k} \end{bmatrix} \tag{7}$$

$\Delta s^{P_k}$ is calculated with Expression 8 using the pseudo-inverse matrix $\Phi^+$ of $\Phi$.

$$\Delta s^{P_k}=\Phi^+ U \tag{8}$$

Now, $\Delta s^{P_k}$ is a three-dimensional vector, so $\Delta s^{P_k}$ can be obtained as long as $2I^{P_k}$ is three or greater, i.e., as long as $I^{P_k}$ is two or greater. Note that $\Phi^+$ can be obtained by $\Phi^+=(\Phi^T\Phi)^{-1}\Phi^T$, or by other methods.

In step S2120, the calibration information calculating unit 180 uses the correction value $\Delta s^{P_k}$ calculated in step S2110 to correct the position vector $s^{P_k}$ of the bird's-eye view marker $P_k$ in the first-person view camera coordinate system using Expression 9, and takes the obtained value as a new $s^{P_k}$.

$$s^{P_k}+\Delta s^{P_k} \rightarrow s^{P_k} \tag{9}$$

In step S2130, the calibration information calculating unit 180 determines whether or not convergence of the calculation has been achieved, using some sort of determination standard, such as whether the error vector U is smaller than a predetermined threshold value, or whether the correction value $\Delta s^{P_k}$ is smaller than a predetermined threshold value. In the event that convergence is determined not to have been achieved, processing returns to step S2080 and the post-correction state vector $s^{P_k}$ is used repeat the processing from step S2080.

Upon determination in step S2130 that convergence of the calculation has been achieved, in step S2140 the calibration information calculating unit 180 outputs the obtained state vector $s^{P_k}$ as a parameter indicating the position of the bird's-eye view marker $P_k$ in the first-person view camera coordinate system.

Finally, in step S2150, determination is made regarding whether or not to end the calibration processing. In the event that the operator instructs the marker calibration device 100 to end the calibration processing, the processing is ended, and in the event that the operator instructs continued calibration processing (i.e., recalibration), the flow returns to step S2010 and awaits input of a data obtaining command.

Thus, the position of markers, provided on an imaging device, as to the imaging device, can be easily and accurately obtained.

<Modification 1-1>

While the present embodiment uses the steepest descent method shown in Expression 10 for calculating the correction value of the state vector, calculation of the correction value does not always need to be obtained with the steepest descent method. For example, this may be obtained with the LM method (Levenberg-Marquardt method) which is a known iterative solving method of linear equations, statistical techniques such as M-estimation which is a known robust estimation technique may be combined therewith, or any other numerical value calculating technique may be applied without detracting from the essence of the present invention. Also, with the present embodiment, in steps S2070 through S2130, an initial value is provided for the position of the marker to be obtained, and an optimal value is obtained by repetitive computation using image Jacobians, but positions of markers can be obtained with a simpler calculation method. For example, expansion of Expression 3 yields the relation shown in Expressions 10 and 11.

$$(u_{xi}^{P_k}r_{31i}^{BC}+f_x^B r_{11i}^{BC})x^{P_k}+(u_{xi}^{P_k}r_{32i}^{BC}+f_x^B r_{12i}^{BC})y^{P_k}+ \\ (u_{xi}^{P_k}r_{33i}^{BC}+f_x^B r_{13i}^{BC})z^{P_k}=-u_{xi}^{P_k}z_i^{BC}-f_x^B x_i^{BC} \tag{10}$$

$$(u_{yi}^{P_k}r_{31i}^{BC}+f_y^B r_{21i}^{BC})x^{P_k}+(u_{ki}^{P_k}r_{32i}^{BC}+f_y^B r_{22i}^{BC})y^{P_k}+ \\ (u_{yi}^{P_k}r_{33i}^{BC}+f_y^B r_{23i}^{BC})z^{P_k}=-u_{yi}^{P_k}z_i^{BC}-f_y^B y_i^{BC} \tag{11}$$

This relation can be applied to directly obtain $S^{P_k}$ from the data list $L^{P_k}=[M_{WCi}, u_i^{P_k}]$ (wherein i=1 on up to $I^{P_k}$) as shown in Expression 12

$$\begin{bmatrix} x^{P_k} \\ y^{P_k} \\ z^{P_k} \end{bmatrix} = \begin{bmatrix} u_{x1}^{P_k} r_{311}^{BC} + f_x^B r_{111}^{BC} & u_{x1}^{P_k} r_{321}^{BC} + f_x^B r_{121}^{BC} & u_{x1}^{P_k} r_{331}^{BC} + f_x^B r_{131}^{BC} \\ u_{y1}^{P_k} r_{311}^{BC} + f_y^B r_{211}^{BC} & u_{y1}^{P_k} r_{321}^{BC} + f_y^B r_{221}^{BC} & u_{y1}^{P_k} r_{331}^{BC} + f_y^B r_{231}^{BC} \\ \vdots & & \\ u_{xI^{P_k}}^{P_k} r_{31I^{P_k}}^{BC} + f_x^B r_{11I^{P_k}}^{BC} & u_{xI^{P_k}}^{P_k} r_{32I^{P_k}}^{BC} + f_x^B r_{12I^{P_k}}^{BC} & u_{xI^{P_k}}^{P_k} r_{33I^{P_k}}^{BC} + f_x^B r_{13I^{P_k}}^{BC} \\ u_{yI^{P_k}}^{P_k} r_{31I^{P_k}}^{BC} + f_y^B r_{21I^{P_k}}^{BC} & u_{yI^{P_k}}^{P_k} r_{32I^{P_k}}^{BC} + f_y^B r_{22I^{P_k}}^{BC} & u_{yI^{P_k}}^{P_k} r_{33I^{P_k}}^{BC} + f_y^B r_{23I^{P_k}}^{BC} \end{bmatrix}^+ \begin{bmatrix} -u_{x1}^{P_k} z_1^{BC} - f_x^B x_1^{BC} \\ -u_{y1}^{P_k} z_1^{BC} - f_y^B y_1^{BC} \\ \vdots \\ -u_{xI^{P_k}}^{P_k} z_{I^{P_k}}^{BC} - f_x^B x_{I^{P_k}}^{BC} \\ -u_{yI^{P_k}}^{P_k} z_{I^{P_k}}^{BC} - f_y^B y_{I^{P_k}}^{BC} \end{bmatrix} \tag{12}$$

-continued where $$\begin{bmatrix} r^{BC}_{11i} & r^{BC}_{12i} & r^{BC}_{13i} & x^{BC}_i \\ r^{BC}_{21i} & r^{BC}_{22i} & r^{BC}_{23i} & y^{BC}_i \\ r^{BC}_{31i} & r^{BC}_{32i} & r^{BC}_{33i} & z^{BC}_i \\ 0 & 0 & 0 & 1 \end{bmatrix} = M^{-1}_{WB} \cdot M_{WC_i} \quad (13)$$

<Modification 1-2>

Also, with the present embodiment, the position-and-orientation calculating unit 120 has been described as calculating the position and orientation of the imaging device 130 based on the correlation between the image coordinates $u^{Q^{kn}}$ of each first-person view marker $Q^{kn}$ detected from the image photographed by the imaging device 130 and the world coordinates $x_W^{Q^{kn}}$ of the markers held beforehand as known information; however, the image features used when obtaining the position and orientation of the imaging device do not necessarily have to be image features manifested as points. For example, the first-person view marker detecting unit 110 and the position-and-orientation calculating unit 120 may be realized by a technique for obtaining the position and orientation of the imaging device using linear features, or a technique for obtaining the position and orientation of the imaging device using geometric features such as ellipses as described in "A. I. Comport, E. Marchand, F. Chaumette: A real-time tracker for markerless augmented reality", Proc. Int'l Symp. On Mixed and Augmented Reality 2003, pp. 36-45, or, a combination of these may be used, in fact, any camera position and orientation estimation method using any image features can be applied.

Also, a hybrid method based on both methods of: the correlation between image features detected from an image taken by the imaging device 130 by attaching a 6-degree-of-freedom position and orientation sensor such as a magnetic sensor or a 3-degree-of-freedom orientation sensor such as a gyro sensor to the imaging device 130, with world coordinates of markers held beforehand as known information; and measurement values of the sensor attached to the imaging device 130. See Uchiyama, Yamamoto, Tamura "A hybrid positioning technique for mixed reality: Concomitant use of 6-degree-of-freedom sensor and vision technique", Japan Virtual Reality Academic Journal, Vol. 8, No. 1, pp. 119-125, 2003, and also Fujii, Kanbara, Iwasa, Takemura, Yokoya "Positioning by stereo camera with concomitant use of gyro sensor for expanded reality", Institute of Electronics, Information and Communication Engineers PRMU 99-192 (Technical Report of IEICE vol. 99, No. 574, pp. 1-8), 1999.

<Modification 1-3>

Figure 7:
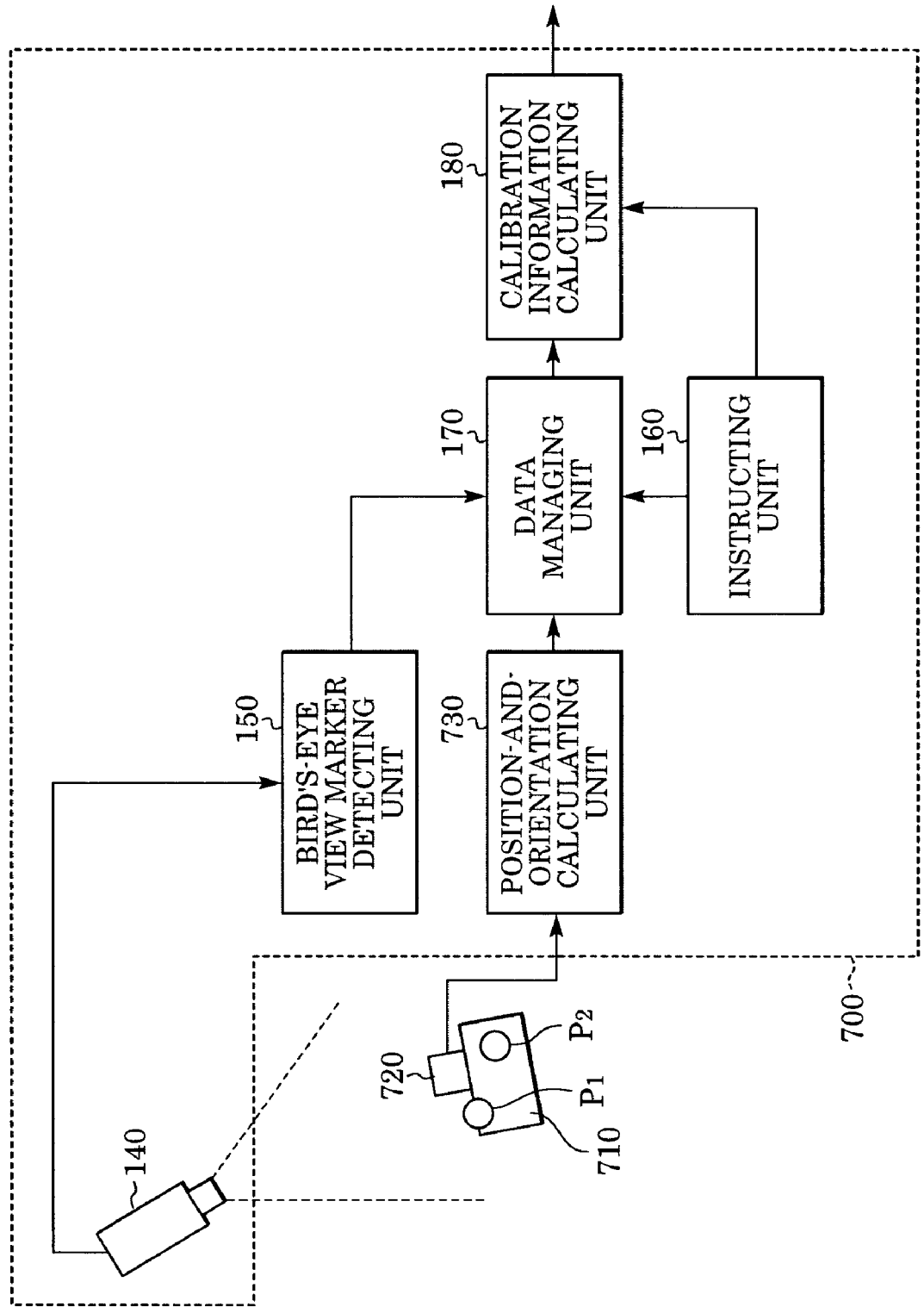
FIG. 7 is a diagram illustrating a configuration of the marker calibration device according to a modification.

With the present embodiment described so far, the object is the imaging device, and in this case the picture information taken by the imaging device itself can be used for measurement of the position and orientation of the object in the world coordinate system. In the event that the object is an arbitrary body, a 6-degree-of-freedom sensor such as a magnetic sensor can be used for measurement of the position and orientation thereof. FIG. 7 illustrates such a case.

The marker calibrating device 700 according to this modification of the present embodiment shown in FIG. 7 is for calibrating markers provided upon an object 710, with the position of each marker as to the object 710, i.e., in an object coordinate system, being calculated for each marker using the 6-degree-of-freedom sensor 720 mounted to the object 710 and the bird's-eye view camera 140. Examples of a 6-degree-of-freedom sensor 720 include magnetic position and orientation sensors (e.g., FASTRAK manufactured by Polhemus of USA, Flock of Birds manufactured by Ascension Technology Corporation of USA), ultrasound sensor, or the like, but the invention is not restricted to these; rather, any other type of 6-degree-of-freedom sensor may be used as well. The marker calibrating device 700 has a position-and-orientation calculating unit 730 to replace the first-person view marker detecting unit 110 and the position-and-orientation calculating unit 120 shown in FIG. 1. The position-and-orientation calculating unit 730 inputs the position and orientation measurement values (the position and orientation of the sensor itself in the sensor coordinates system) from the 6-degree-of-freedom sensor 720, calculates the position and orientation of the object 710 in the world coordinates system from the position and orientation measurement values using known calibration information, and outputs this to the data managing unit 170 in accordance with a request from the data managing unit 170. Otherwise, the marker calibrating device 700 is the same as the marker calibrating device 100.

<Modification 1-4>

With the present embodiment described so far, the camera used for photographing the object is a bird's-eye view camera set at a fixed position, but the bird's-eye view camera does not need to be fixed in the event that the position and orientation of the camera can be measured in the world coordinate system.

For example, an arrangement may be made in which a 6-degree-of-freedom sensor such as a magnetic position and orientation sensor (e.g., FASTRAK manufactured by Polhemus of USA, Flock of Birds manufactured by Ascension Technology Corporation of USA), optical sensor (e.g., Optotrak manufactured by NDI of Canada, Vicon Tracker manufactured by Vicon Motion Systems Inc of Great Britain), ultrasound sensor, or the like, is attached to the bird's-eye view camera, and the position and orientation of the bird's-eye view camera as to the world coordinate system is obtained from the sensor measurement values. Also, the position and orientation of the bird's-eye view camera may be obtained from image coordinates $u^{Q^{kn}}$ of first-person markers $Q^{kn}$ taken by the bird's-eye view camera, and world coordinates $Xw^{Q^{kn}}$ of the markers held beforehand as known information. Further, an arrangement may be made in which the above-described 6-degree-of-freedom sensor or a 3-degree-of-freedom sensor is attached to the bird's-eye view camera and the position and orientation of the bird's-eye view camera is obtained by hybrid methods based on both of the bird's-eye view image and the measurement values of the sensor.

In this case, the position and orientation of the bird's-eye view camera measured by the aforementioned methods are obtained simultaneously as the position and orientation of the imaging device 130, and saved in a data list in step S2040. Then, in step S2080, the values calculated based on the position and orientation values held in the data list are used for $M_{WB}$ in Expression 2 (representing the position and orientation of the bird's-eye view camera in the world coordinates), rather than a fixed value held beforehand as a known value.

Second Embodiment

With the present embodiment, in a case in which multiple markers provided upon the imaging device have a marker coordinate system, and the coordinates of each of the markers in the marker coordinate system is known, the marker calibration device obtains the position and orientation of the marker coordinate system as to the imaging device, or the position for each marker as to the imaging device. The following is a description of the marker calibration device and marker calibration method according to the present embodiment.

Figure 3:
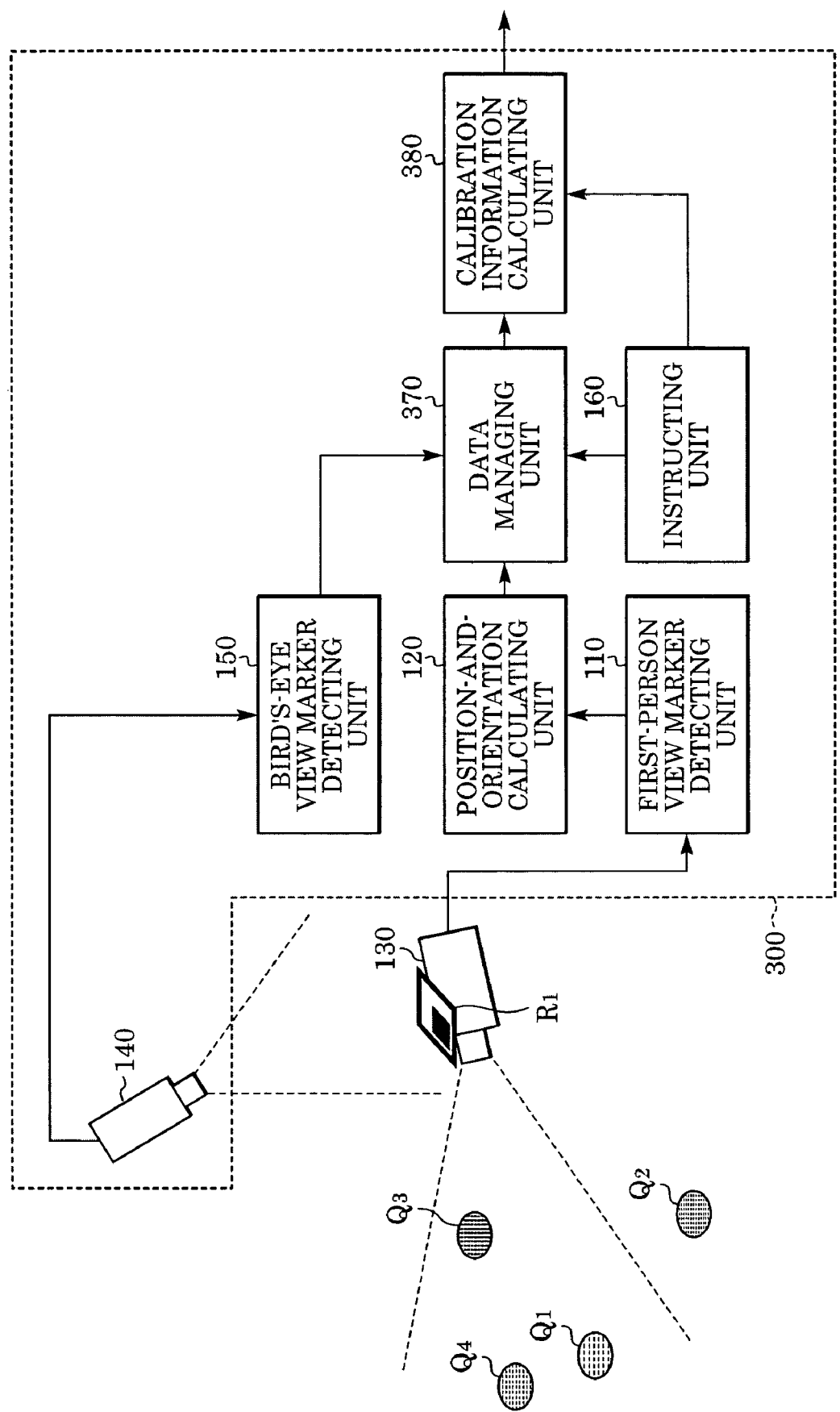
FIG. 3 is a diagram illustrating a configuration of the marker calibration device according to a second embodiment.

FIG. 3 is a diagram illustrating an exemplary configuration of a marker calibration device according to the present embodiment. Note that components which are the same as those shown in FIG. 1 are denoted with the same reference numerals and characters, and detailed description thereof is not repeated here. As shown in FIG. 3, the marker calibration device 300 includes a first-person view marker detecting unit 110, a position-and-orientation calculating unit 120, a bird's-eye view camera 140, a bird's-eye view marker detecting unit 150, an instructing unit 160, a data managing unit 370, and a calibration information calculating unit 380, and is connected to the imaging device 130 which is to be calibrated.

This description will proceed with the understanding that the user of the marker calibration device 300 according to the present embodiment sets one or more markers $P_k$ (wherein k=1 up to $K_2$) to be calibrated (hereafter referred to as "bird's-eye view marker", as with the first embodiment). The position of a bird's-eye view marker in a first-person view camera coordinate system is unknown, as with the first embodiment, but with the present embodiment, the relative positional relationship between the markers is known. An example of such a case is an arrangement in which a group of four bird's-eye view markers $P_k$ (wherein k=1, 2, 3, 4) form a single square marker $R_1$ of which size is known. FIG. 3 illustrates such a situation. Here, with one point on the square marker $R_1$ defined as a point of origin, and further, three orthogonal axes defined each as the X-axis, Y-axis, and Z-axis, the coordinates of each of the bird's-eye view markers $P_k$ in the marker coordinate system are known. Accordingly, the unknown positions of each of the bird's-eye view markers $P_k$ in the first-person view camera coordinate system can be calculated once the position and orientation of the marker coordinate system in the first-person view camera coordinate system (i.e., a conversion matrix for converting the coordinates in the marker coordinate system into first-person view camera coordinates) is found out. Accordingly, the information which the marker calibrating device according to the present embodiment calibrates is the position and orientation of the marker coordinate system in the first-person view camera coordinates system.

Disposed in multiple points in real space are multiple first-person view markers $Q^k$ having known positions in the world space coordinate system, as markers for photographing with the imaging device 130, as with the first embodiment.

As with the first embodiment, the first-person view marker detecting unit 110 inputs the first-person view image from the imaging device 130, detects the image coordinates of the first-person view markers $Q^k$ taken in the input image, and outputs the image coordinates $u^{Qkn}$ and the identifier thereof $k_n$ for each of the detected first-person view markers $Q^{kn}$ to the position-and-orientation calculating unit 120.

As with the first embodiment, the position-and-orientation calculating unit 120 calculates the position and orientation of the imaging device 130, based on the correlation between the image coordinates $u^{Qkn}$ of each of the detected first-person view markers $Q^{kn}$, and the world coordinates $x_w^{Qkn}$ held beforehand as known information. This calculation is as described above in the first embodiment. The position and orientation of the imaging device 130 in the work coordinate system thus calculated is output to the data managing unit 370 in accordance with a request from the data managing unit 370.

As with the first embodiment, the bird's-eye view camera 140 is fixed and positioned at a position capable of taking the imaging device 130 when obtaining data for marker correction. The position and orientation of the bird's-eye view camera 140 in the world coordinates are to be held in the calibration information calculating unit 380 beforehand as known values.

As with the first embodiment, the bird's-eye view marker detecting unit 150 inputs an image photographed by the bird's-eye view camera 140, detects image coordinates of a bird's-eye view marker $P_k$ taken in the image by processing similar to that of the first-person view marker detecting unit 110, and outputs to the data managing unit 370 the image coordinates $u^{Qkm}$ and the identifier thereof $k_m$ detected according to the request of the data managing unit 370. In the example shown in FIG. 3, a square marker is used as the marker, so the square marker detecting processing described in the first embodiment is executed.

As with the first embodiment, in the event that a data obtaining command is input from an operator (not shown), the instructing unit 160 transmits an "obtain data" instruction to the data managing unit 370, and in the event that a calibration information calculation command is input, transmits a "calibration information calculation" instruction to the calibration information calculating unit 380.

Upon the data managing unit 370 receiving an "obtain data" instruction from the instructing unit 160, the position and orientation of the imaging device 130 in the world coordinate system is input from the position-and-orientation calculating unit 120, the image coordinates of the bird's-eye view markers and the identifiers thereof are input from the bird's-eye view marker detecting unit 150, and the pair of "position and orientation of imaging unit 130 and image coordinates of bird's-eye view markers" is added to and held in a data list prepared for each identifier of the bird's-eye view markers. Now, the position and orientation of the imaging device 130 in the world coordinate system input from the position-and-orientation calculating unit 120 is data obtained at the same time as the time of photographing the image from which the image coordinates of the bird's-eye view markers have been detected, input from the bird's-eye view marker detecting unit 150. Also, the data managing unit 370 outputs a data list for each bird's-eye view marker generated to the calibration information calculating unit 380, in response to a request from the calibration information calculating unit 380.

Upon the calibration information calculating unit 380 receiving a "calibration information calculation" from the instructing unit 160, a data list is input for the data managing unit 370, calibration processing is performed based thereupon, and calibration information obtained as the result thereof (i.e., the position of each bird's-eye view marker in the first-person view camera coordinate system) is output.

Figure 4:
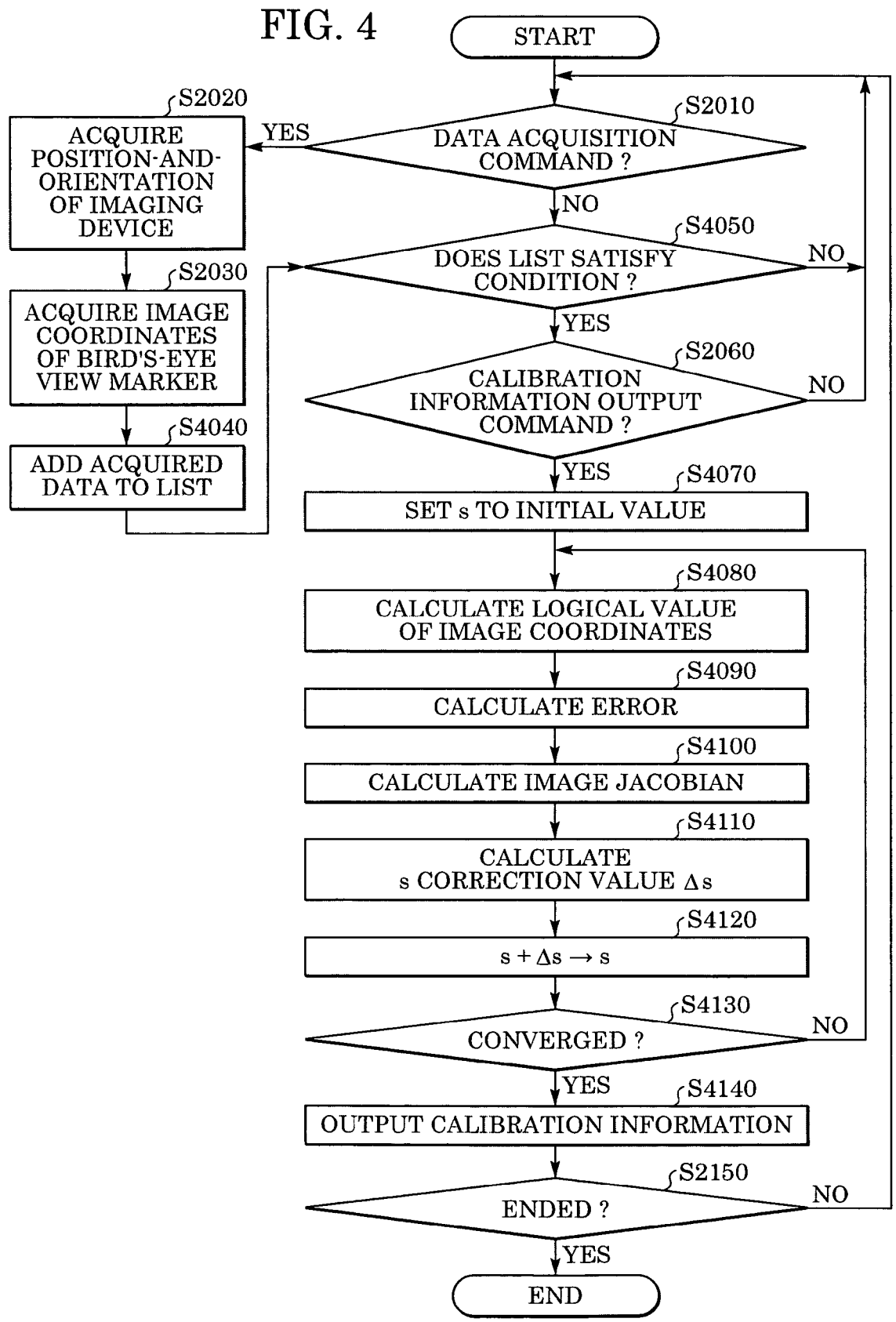
FIG. 4 is a flowchart illustrating a process of the marker calibration method according to the second embodiment.

FIG. 4 is a flowchart illustrating processing performed at the time of the calibration device obtaining calibration information according to the present embodiment. Note that portions which are the same as those shown in FIG. 2 are denoted with the same reference numerals and characters, and detailed description thereof will not be repeated here. Program code according to the flowchart is stored in memory within the device according to the present embodiment, such as RAM, ROM, or the like (not shown), which is then read out by a CPU (not shown) and executed.

First, in step S2010, the instructing unit 160 determines whether or not a data obtaining command has been input from the operator. If it is determined in step S2010 that a data obtaining command has been input, processing proceeds to step S2020 and processing of steps S2020, S2030 and S4040 are performed prior to processing proceeding to step S4050. On the other hand, if it is determined in step S2010 that a data obtaining command has not been input, processing proceeds directly to step S4050. Processing for steps S2010, S2020 and S2030 is the same as that in the first embodiment as described above. Upon completing step S2030, the flow proceeds to the processing in step S4040.

In step S2040, the data managing unit 370 adds the input data pair as data $D_j$ to the data list L for each bird's-eye view marker $P_{km}$ that is detected. Specifically, with the $M_{WC}$ input from the position-and-orientation calculating unit 120 as $M_{WCj}$, the identifier $k_m$ input from the bird's-eye view marker detecting unit 150 as $k_j$, and the $u^{Pkm}$ also input from the bird's-eye view marker detecting unit 150 as $u_j^{Pk}$, the sets of $[M_{WCj}, u_j^{Pk}, k_j]$ are registered in the data list L regarding the bird's-eye view marker $P_k$ as j'th data relating to $P_k$. Note that j (j=1 on up to $J^{Pk}$) is an index for each of the pairs registered in the data list L, and J represents the total number of pairs that have been registered. Thus, data is obtained.

In step S4050, data lists regarding all bird's-eye view markers obtained so far by the data managing unit 370, or data lists regarding at least one bird's-eye view marker, are subjected to determination regarding whether or not the data list is sufficient for calculating calibration information. In the event that at least one data list or all data lists are found to not satisfy the conditions, the flow returns to step S2010, and awaits input of a data obtaining command. On the other hand, in the event that at least one data list or all data lists are found to satisfy the conditions for calibration information calculation, the flow proceeds to step S2060. An example of a condition for a data list satisfying the conditions for calibration information calculation is for the data list L to contain data regarding three or more different bird's-eye view markers $P_k$. However, the greater the diversity in the input data is, the higher the precision of the yielded calibration information is, so arrangements may be made in which conditions are set to request a greater amount of data.

Next, in step S2060, determination is made regarding whether or not a calibration information calculation command has been input from the operator. In the event that a calibration information calculation command has been input, the processing advances to step S4070, while in the event that a calibration information calculation command has not been input, the flow returns to step S2010 and awaits input of a data obtaining command.

The calibration information calculating unit 380 handles the calibration information to be obtained, i.e., the position of the bird's-eye view marker in the first-person view camera coordinate system, as a six-valued vector $[xyz\xi\psi\zeta]^T$. In the following description, this unknown parameter will be described as state vector $s=[xyz\xi\psi\zeta]^T$.

In step S4070, the calibration information calculating unit 380 gives the state vector s a suitable initial value. As for the initial value, the operator may manually input a general value using the instructing unit 160, or an arrangement may be made wherein detection coordinates of multiple bird's-eye view markers input at a certain time (i.e., detected from the same bird's-eye view image) are extracted from the list L, and this data is used to calculate the position and orientation of the marker coordinate system in the bird's-eye view coordinate system using a known method, a conversion matrix $M_{BM}$ for converting the coordinates in the marker coordinate system into the bird's-eye view camera coordinate system is obtained from the obtained position and orientation, and further, a conversion matrix $M_{CM}$ representing the position and orientation of the marker coordinates in the first-person view camera coordinate system is obtained from Expression 14 using the imaging device position and orientation $M_{WC}$ input at the same time and held in the list L, and the position and orientation represented by this matrix is used as the initial value of s.

$$M_{CM} = M_{WC}^{-1} \cdot M_{WB} \cdot M_{BM} \tag{14}$$

where $M_{WB}$ is a conversion matrix for converting coordinates in the bird's-eye view camera coordinate system into world coordinates, which has been calculated beforehand based on the position and orientation of the bird's-eye view camera 140 in the world coordinate system, held beforehand as a known value.

Now, examples of known techniques for calculating the position and orientation of the marker coordinates system in the bird's-eye view coordinate system include a technique in which, in the event that the first-person view markers are placed on the same plane, detecting four or more markers allows the position and orientation of the imaging device to be detected by two-dimensional homographic calculations. Also included are a technique using six or more markers not on the same plane, and a technique for obtaining an optimized solution, with these solutions as initial values, by repetitive calculation such as the Gauss-Newton method.

In step S4080, the calibration information calculating unit 380 calculates the logical value $u_j^{Pkj\prime}=[u_{xj}^{Pkj\prime}, u_{yj}^{Pkj\prime}]$ of the bird's-eye view image coordinates of the bird's-eye view marker $P_{kj}$ for all j's, based on each data set $D_{j=[MWCj}, u_j^{Pkj}, k_j]$ (wherein j=1 on up to J) in the data list L. Note that here, the logical value of the bird's-eye view image coordinates of the bird's-eye view marker means data for the position (coordinates) in the bird's-eye view image at which the bird's-eye view marker $P_{kj}$, regarding which the position vector $s_M^{Pkj}$ in the marker coordinate system is known, should be visible, at the time that the position and orientation of the marker coordinate system in the first-person view camera coordinate system is s. Calculation of $u_j^{Pkj\prime}$ is performed based on the function shown in Expression 15.

$$u_j^{P_{kj}\prime} = F_j(s) \tag{15}$$

The function shown in Expression 15 represents the position of the marker coordinate system in the first-person view camera coordinate system.

Specifically, the function $F_j(\ )$ is configured as shown in Expression 16.

$$x_{Bj}^{P_{kj}} = \left[ x_{Bj}^{P_{kj}} \ y_{Bj}^{P_{kj}} \ z_{Bj}^{P_{kj}} \ 1 \right]^T = M_{WB}^{-1} \cdot M_{WCj} \cdot M_{CM}(s) \cdot x_M^{P_{kj}} \tag{16}$$

The function shown in Expression 16 is used for obtaining the position vector $x_{Bj}^{Pkj}$ of the bird's-eye view marker $P_k$ in the bird's-eye view camera coordinates at the point of having obtained a j'th data set (i.e., at the point that the position and orientation of the imaging device 130 is $M_{WCj}$) from s. Expression 17 is used for obtaining the coordinates $u_j^{Pkj}{}'$ of the bird's-eye view marker $P_{kj}$ in the bird's-eye view camera image from $x_{Bj}^{Pkj}$.

$$u_j^{P_{k_j}}{}' = \begin{bmatrix} ux_j^{P_{k_j}}{}' & uy_j^{P_{k_j}}{}' \end{bmatrix} = \begin{bmatrix} -f_x^B \frac{x_{B_j}^{P_{k_j}}}{z_{B_j}^{P_{k_j}}} & -f_y^B \frac{y_{B_j}^{P_{k_j}}}{z_{B_j}^{P_{k_j}}} \end{bmatrix}^T \quad (17)$$

Note that here, $f^B_x$ and $f^B_y$ denote the focal distance of the bird's-eye view camera 140 in the x-axial direction and the y-axial direction, respectively, and are to be understood to be known values held beforehand. Also, $M_{CM}(s)$ is a modeling conversion matrix (a matrix for converting coordinates in the marker coordinate system into coordinates in the first-person view camera coordinate system) and is defined by Expression 18.

$$M_{CM}(s) = \begin{bmatrix} \frac{\xi^2}{\theta^2}(1-\cos\theta)+\cos\theta & \frac{\xi\psi}{\theta^2}(1-\cos\theta)-\frac{\zeta}{\theta}\sin\theta & \frac{\xi\zeta}{\theta^2}(1-\cos\theta)+\frac{\psi}{\theta}\sin\theta & x \\ \frac{\psi\xi}{\theta^2}(1-\cos\theta)+\frac{\zeta}{\theta}\sin\theta & \frac{\psi^2}{\theta^2}(1-\cos\theta)+\cos\theta & \frac{\psi\zeta}{\theta^2}(1-\cos\theta)-\frac{\xi}{\theta}\sin\theta & y \\ \frac{\zeta\xi}{\theta^2}(1-\cos\theta)-\frac{\psi}{\theta}\sin\theta & \frac{\zeta\psi}{\theta^2}(1-\cos\theta)+\frac{\xi}{\theta}\sin\theta & \frac{\zeta^2}{\theta^2}(1-\cos\theta)+\cos\theta & z \\ 0 & 0 & 0 & 1 \end{bmatrix} \quad (18)$$

where $$\theta = \sqrt{\xi^2 + \psi^2 + \zeta^2} \quad (19)$$

holds.

In step S4090, the calibration information calculating unit 380 calculates the error $\Delta u_j^{Pkj}$ between the actual image coordinates $u_j^{Pkj}$ of bird's-eye view markers $P_{kj}$ contained in each data set in the data list L and the corresponding image coordinates logical value $u_j^{Pkj}{}'$, for all j's, with Expression 20.

$$\Delta u_j^{P_{k_j}} = u_j^{P_{k_j}} - u_j^{P_{k_j}}{}' \quad (20)$$

In step S4100, the calibration information calculating unit 380 calculates the image Jacobian matrix $$J_{u_j s}^{Pk}(=\partial u_j^{Pkj}/\partial s)$$

regarding the state vector s (i.e., a 2-row×6-column Jacobian matrix having for the components thereof the solutions obtained by partial differentiation of the function $F_j(\ )$ in Expression 17 with the components of the state vector s), for all j's. Specifically, a 2-row×3-column Jacobian matrix $$J_{u_j B_j}^{Pkj}(=\partial u_j^{Pkj}/\partial x_{Bj}^{Pkj})$$

having for the components thereof the solutions obtained by partial differentiation of the right side of Expression 19 with the components of the position vector $x_{Bj}^{Pkj}$, and a 3-row×6-column Jacobian matrix $$J_{xBjs}^{Pkj}(=\partial x_{Bj}^{Pkj}/\partial s^{Pkj})$$

having for the components thereof the solutions obtained by partial differentiation of the right side of Expression 18 with the components of the state vector s, are calculated, and $J_{u_j}^{Pk}{}_s$ is calculated using Expression 21.

$$J_{u_j s}^{P_{k_j}} = J_{u_j x_{Bj}}^{P_{k_j}} \cdot J_{x_{Bj} s}^{P_{k_j}} \quad (21)$$

In step 4110, the calibration information calculating unit 380 calculates a correction value Δs based on the error $\Delta_j^{Pkj}$ and the Jacobian matrices $J_{u_j}^{Pk}{}_s$ calculated above for all j's.

Specifically, an error vector of a 2J dimension vector vertically giving errors $\Delta u_j^{Pkj}$ for all j's in shown in Expression 22.

$$U = \begin{bmatrix} \Delta u_1^{P_{k_1}} \\ \Delta u_2^{P_{k_2}} \\ \vdots \\ \Delta u_J^{P_{k_J}} \end{bmatrix} \quad (22)$$

A 2J row×6 column matrix vertically giving the Jacobian matrices $J_{u_j}^{Pk}{}_s$ are created as shown in Expression 23.

$$\Phi = \begin{bmatrix} J_{u_1 s}^{P_{k_1}} \\ J_{u_2 s}^{P_{k_2}} \\ \vdots \\ J_{u_J s}^{P_{k_J}} \end{bmatrix} \quad (23)$$

Δs is calculated with Expression 24 using the pseudo-inverse matrix $\Phi^+$ of $\Phi$.

$$\Delta s = \Phi^+ U \quad (24)$$

Δs is a six-dimensional vector, so Δs can be obtained as long as 2J is six or greater, i.e., as long as J is three or greater. Note that $\Phi^+$ can be obtained by $\Phi^+=(\Phi^T\Phi)^{-1}\Phi^T$, or by other methods.

In step S4120, the calibration information calculating unit 380 uses the correction value Δs calculated in step S4110 to correct the state vector s representing the position and orientation of the marker coordinates in the first-person view camera coordinate system using Expression 25, and takes the obtained value as a new s.

$$s+\Delta s \rightarrow s \quad (25)$$

In step S4130, the calibration information calculating unit 380 determines whether or not convergence of the calculation has been achieved, using some sort of determination standard, such as whether the error vector U is smaller than a predetermined threshold value, or whether the correction value $\Delta s$ is smaller than a predetermined threshold value. In the event that convergence is determined not to have been achieved, processing is repeated from step S4080 using the post-correction state vector s.

Upon determination in step S4130 that convergence of the calculation has been achieved, in step S4140 the calibration information calculating unit 380 outputs the obtained state vector s as a parameter indicating the position of the marker coordinate system in the first-person view camera coordinates system. The output format at this time may be s itself, or may be an arrangement in which the position component of s is represented with a three-value vector and the orientation component is represented with an Euler angle or rotating matrix, or may be a coordinate conversion matrix $M_{CM}$ generated from s.

Finally, in step S2150, determination is made regarding whether or not to end the calibration processing. In the event that the operator instructs the marker calibration device 300 to end the calibration processing, the processing is ended, and in the event that the instructor instructs continued calibration processing (i.e., recalibration), the flow returns to step S2010 and awaits input of a data obtaining command.

Thus, the position of markers, provided on an imaging device, as to the imaging device, can be easily and accurately obtained.

<Modification 2-1>

While the present embodiment has been described as outputting the position and orientation of the marker coordinate system in the first-person camera coordinate system as calibration information, an arrangement may be made wherein the position of each bird's-eye view marker $P_k$ is calculated in the first-person camera coordinate system and output as calibration system. In this case, the position of each bird's-eye view marker $P_k$ in the first-person camera coordinate system can be obtained as the product of the coordinate conversion matrix $M_{CM}$ obtained from s, and the known position $x_M^{Pk}$ of the bird's-eye view marker $P_k$ in the marker coordinate system.

<Modification 2-2>

Also, while the present embodiment has been described as the position-and-orientation calculating unit 120 calculating the position and orientation of the imaging device 130 based on the correlation of the image coordinates $u^{Qkn}$ of the first-person view markers $Q^{kn}$ each detected from the image taken by the imaging device 130, and the world coordinates $s_W^{Qkn}$ held beforehand as known information, image-and-position detection using other information, and image-and-position detection using other sensors as well, may be performed, as with <Modification 1-2> of the first embodiment.

<Modification 2-3>

While the present embodiment uses the steepest descent method shown in Expression 26 for calculating the correction value of the state vector, calculation of the correction value does not always need to be obtained with the steepest descent method. For example, this may be obtained with the LM method (Levenberg-Marquardt method) which is a known iterative solving method of linear equations, statistical techniques such as M-estimation which is a known robust estimation technique may be combined therewith, or any other numerical value calculating technique may be applied without detracting from the essence of the present invention.

Also, while the present embodiment has been described as a suitable initial value being provided for the position and orientation s of the marker coordinate system in the first-person view camera coordinate system, and an optimal value is obtained for s regarding all input data by repetitive computation using image Jacobians, but the position and orientation of the marker coordinate system in the first-person view camera coordinate system can be obtained with a simpler calculation method. For example, the position and orientation or the marker coordinate system in the first-person view camera coordinate system can be obtained using only the detected coordinates of multiple first-person view markers in a single bird's-eye view image, and these output as calibration information, according to the procedures described regarding step S4070, for example.

<Modification 2-4>

Further, while the present embodiment has been described as using a square marker for the bird's-eye view markers, the type of marker is unrestricted so long a marker group is realized wherein the position of each marker in the marker coordinate system is known. For example, a set of multiple circular markers such as used with the first embodiment may be used, or, multiple types of markers may coexist. Moreover, calibration can be similarly performed even in cases of having multiple marker coordinate systems, by performing the above-described processing for each of the marker coordinate systems individually, or by performing the above-described processing for each of the marker coordinate systems in parallel.

<Modification 2-5>

With the present embodiment described so far, the object is the imaging device, and in this case the picture information taken by the imaging device itself can be used for measurement of the position and orientation of the object in the world coordinate system. In the event that the object is an arbitrary body, a 6-degree-of-freedom sensor such as a magnetic sensor can be used for measurement of the position and orientation thereof. The configuration of such a case is the same as that of the <Modification 1-3> of the first embodiment shown in FIG. 7. Examples of a 6-degree-of-freedom sensor include magnetic position and orientation sensors (e.g., FASTRAK manufactured by Polhemus of USA, Flock of Birds manufactured by Ascension Technology Corporation of USA), ultrasound sensor, or the like, but the invention is not restricted to these; rather, any other type of 6-degree-of-freedom sensor may be used as well.

<Modification 2-6>

With the present embodiment described so far, the camera used for photographing the object is a bird's-eye view camera set at a fixed position, but the bird's-eye view camera does not need to be fixed in the event that the position and orientation of the camera can be measured in the world coordinate system, as with the <Modification 1-4> of the first embodiment.

In this case, the position and orientation of the bird's-eye view camera measured by the aforementioned methods are obtained simultaneously as the position and orientation of the imaging device 130 in step S2020, and saved in a data list in step S4040. Then, in step S4080, the values calculated based on the position and orientation values held in the data list are used for $M_{WB}$ in Expression 18 (representing the position and orientation of the bird's-eye view camera in the world coordinates), rather than a fixed value held beforehand as a known value.

Third Embodiment

With the present embodiment, in a case in which multiple markers provided upon the imaging device have a marker coordinate system, and the coordinates of each of the markers in the marker coordinate system is known, the marker calibration device obtains the position and orientation of the marker coordinate system as to the imaging device, or the position for each marker as to the imaging device, as with the second embodiment. The following is a description of the marker calibration device and marker calibration method according to the present embodiment.

Figure 5:
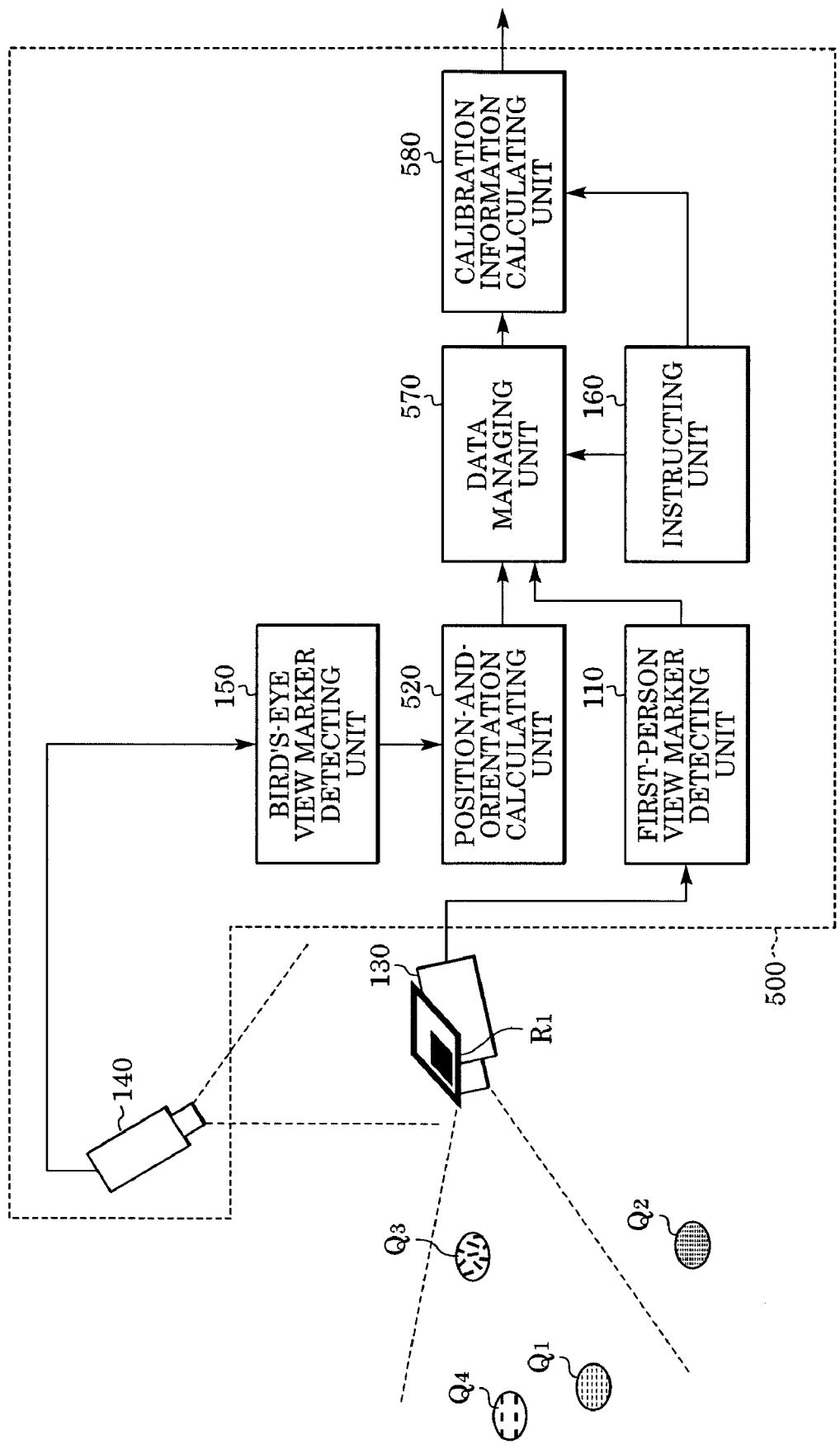
FIG. 5 is a diagram illustrating a configuration of the marker calibration device according to a third embodiment.

FIG. 5 is a diagram illustrating a configuration of a marker calibration device according to the present embodiment. Note that components which are the same as those shown in FIG. 3 are denoted with the same reference numerals and characters, and detailed description thereof is not repeated here. As shown in FIG. 5, the marker calibration device 500 includes a first-person view marker detecting unit 110, a bird's-eye view camera 140, a bird's-eye view marker detecting unit 150, an instructing unit 160, a position-and-orientation calculating unit 520, a data managing unit 570, and a calibration information calculating unit 580, and is connected to the imaging device 130 which is to be calibrated. This description will proceed with the understanding that the user of the marker calibration device 500 according to the present embodiment sets one or more markers $P_k$ (wherein k=1 up to $K_2$) to be calibrated, as with the second embodiment. The present embodiment is the same as the second embodiment in that first-person view markers $Q_k$ are set, and also, the operations of the first-person view marker detecting unit 110, bird's-eye view camera 140, bird's-eye view marker detecting unit 150, and instructing unit 160 are the same as with the second embodiment; accordingly, detailed description thereof is not repeated here. The present embodiment differs from the second embodiment in that the first-person view marker detecting unit 110 outputs detection results to the data managing unit 570 upon a request from the data managing unit 570, and that the bird's-eye view marker detecting unit 150 outputs detection results to the position-and-orientation calculating unit 520. Also, while the second embodiment involved obtaining the position and orientation of the imaging device 130 using the detecting results of the first-person view markers, meaning that as many markers as necessary for calculating the position and orientation of the imaging device 130 need to be detected from a single first-person view image, with the present embodiment, only one or more markers need to be detected from a single first-person view image.

The position-and-orientation calculating unit 520 inputs the image coordinates $u^{Pkm}$ of the bird's-eye view marker $P_{km}$ and the identifier thereof from the bird's-eye view marker detecting unit 150, and calculates the position and orientation of the marker coordinate system in the bird's-eye view camera coordinate system, based on the correlation between the marker coordinate system held beforehand as known information, and the three-dimensional coordinates $x_M^{Pkm}$ of each of the markers. This calculation method is the same processing as that described with step S4070 in the second embodiment, so detailed description thereof is not repeated here. The calculated position and orientation is output to the data managing unit 370, upon request from the data managing unit 370.

In the following description, the position and orientation of the marker coordinate system in the bird's-eye view camera coordinate system is held by a 4×4 homogeneous coordinates matrix $M_{BM}$ (a matrix for converting the coordinates in the marker coordinate system into coordinates in the bird's-eye view camera coordinate system).

Upon the data managing unit 570 receiving an "obtain data" instruction from the instructing unit 160, the image coordinates of the first-person marker and the identifier thereof are input from the first-person view marker detecting unit 110, and the position and orientation of the marker coordinate system in the first-person view camera coordinate system are input from the position-and-orientation calculating unit 520, and the set of "position and orientation of the marker coordinate system in the first-person view camera coordinate system, image coordinates of first-person view marker, and identifier of first-person view marker" is created for each input first-person view marker, and added to and held in a single data list. Also, the data managing unit 570 outputs the generate data list to the calibration information calculating unit 580, upon request from the calibration information calculating unit 580.

Upon the calibration information calculating unit 580 receiving a "calibration information calculation" instruction from the instructing unit 160, the data list is input for the data managing unit 570, calibration processing is performed based thereupon, and calibration information obtained as the result thereof (i.e., the position and orientation of the marker coordinate system in the first-person view camera coordinate system) is output.

Figure 6:
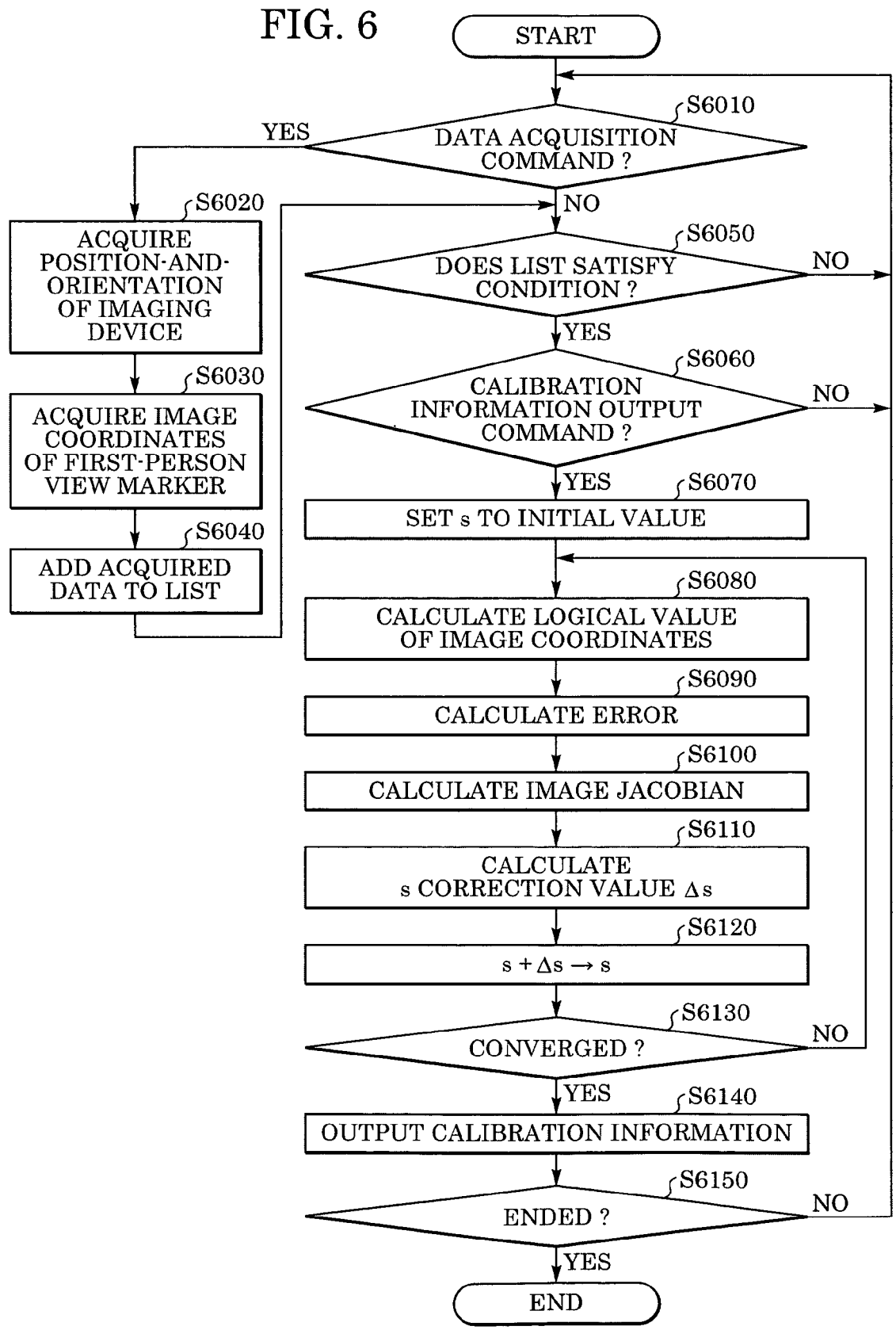
FIG. 6 is a flowchart illustrating a process of the marker calibration method according to the third embodiment.

FIG. 6 is a flowchart illustrating processing performed at the time of the calibration device obtaining calibration information according to the present embodiment. Program code according to the flowchart is stored in memory within the device according to the present embodiment, such as RAM, ROM, or the like (not shown), which is then read out by a CPU (not shown) and executed.

In step S6010, the instructing unit 160 determines whether or not a data obtaining command has been input from the operator. The operator inputs a data obtaining command upon the imaging device 130 being placed at a position for obtaining marker calibration data. If a data obtaining command has been input, the instructing unit 160 advances the processing to step S6020. If a data obtaining command has not been input, the instructing unit 160 advances the processing to step S6050.

In step S6020, the data managing unit 570 inputs the position and orientation $M_{BM}$ of the marker coordinate system in the first-person view camera coordinate system, from the position-and-orientation calculating unit 520.

In step S6030, the data managing unit 570 inputs, from the first-person view marker detecting unit 110, the image coordinates $u^{Qkn}$ of the first-person view markers $Q_{kn}$ each detected by the first-person view marker detecting unit 110 and the identifiers $k_n$ thereof.

In step S6040, the data managing unit 570 adds each input first-person view marker $Q_{kn}$ as data $D_j$ to the data list L. Specifically, with the $M_{WC}$ input from the position-and-orientation calculating unit 520 as $M_{Wcj}$, the identifier $k_n$ input from the first-person view marker detecting unit 110 as $k_j$, and the $u^{Qkn}$ also input from the first-person view marker detecting unit 110 as $u_j^{Qkj}$, the set of $D_j=[M_{Bmj}, u_j^{Qkj}, k_j]$ is registered in the data list L as j'th data. Note that j (j=1 on up to J) is an index for each of the sets registered in the data list L, and J represents the total number of pairs that have been registered. Thus, data is obtained.

In step S6050, data lists obtained so far by the data managing unit 570 are subjected to determination regarding whether or not the data list is sufficient for calculating calibration information. In the event that the data lists are found to not satisfy the conditions, the flow returns to step S6010, and awaits input of a data obtaining command. On the other hand, in the event that the data lists are found to satisfy the conditions for calibration information calculation, the flow proceeds to step S6060. An example of a condition for a data list satisfying the conditions for calibration information calculation is for the data list L to contain data regarding three or more different first-person view markers $Q_k$. However, the greater the diversity in the input data is, the higher the precision of the yielded calibration information is, so arrangements may be made in which conditions are set to request a greater amount of data.

Next, in step S6060, determination is made regarding whether or not a calibration information calculation command has been input from the operator. In the event that a calibration information calculation command has been input, the processing advances to step S6070, while in the event that a calibration information calculation command has not been input, the flow returns to step S6010 and awaits input of a data obtaining command.

The calibration information calculating unit 580 handles the calibration information to be obtained, i.e., the position and orientation of the marker coordinate system in the first-person view camera coordinate system, as a six-valued vector $[xyz\xi\psi\zeta]^T$. In the following description, this unknown parameter will be described as state vector $s=[xyz\xi\psi\zeta]^T$.

In step S6070, as with the second embodiment, the calibration information calculating unit 580 gives the state vector s a suitable initial value. As for the initial value, the operator manually inputs a general value using the instructing unit 160, for example.

In step S6080, the calibration information calculating unit 580 calculates the logical value $u_j^{Qkj*}=[u_{xj}^{Qkj*}, u_{yj}^{Qkj*}]$ of the first-person view image coordinates of each first-person view marker $Q_{kj}$ for all j's, based on each data set $D_j$ (wherein j=1, 2, and so on up to J) in the data list L. Note that here, the logical value of the first-person view image coordinates of the first-person view marker means data for the position (coordinates) in the bird's-eye view image at which the first-person view marker $Q_{kj}$, regarding which the position $x_W^{Qkj}$ in the world coordinate system is known, should be visible, at the time that the position and orientation of the marker coordinate system in the bird's-eye view camera coordinate system is $M_{BMj}$ and the position and coordinates of the marker coordinate system in the first-person camera coordinate system is s. Calculation of $u_j^{Qkj*}$ is performed based on the function of s shown in Expression 26.

$$u_j^{Q_{k_j}'} = F_j(s) \tag{26}$$

Specifically, the function $F_j(\ )$ is configured of as shown in Expression 27.

$$x_{Cj}^{Q_{k_j}} = \begin{bmatrix} x_{Cj}^{Q_{k_j}} & y_{Cj}^{Q_{k_j}} & z_{Cj}^{Q_{k_j}} & 1 \end{bmatrix}^T = M_{CM}(s) \cdot M_{BM}^{-1} \cdot M_{WB}^{-1} \cdot x_W^{Q_{k_j}} \tag{27}$$

Expression 27 us used for obtaining the position $x_{Cj}^{Qkj}$ of the first-person view camera coordinates at the point of having obtained a j'th data set (i.e., at the point that the position and orientation of the marker coordinate system in the bird's-eye view camera coordinate system is $M_{BMj}$) from s. Expression 28 is used for obtaining the coordinates $$u_j^{Q_{k_j}'}$$

of the first-person view marker $Q^{kj}$ in the first-person view camera image from $$x_{Cj}^{Qkj}.$$

$$u_j^{Q_{k_j}'} = \begin{bmatrix} ux_j^{Q_{k_j}'} & uy_j^{Q_{k_j}'} \end{bmatrix}^T = \begin{bmatrix} -f_x^C \frac{x_{Cj}^{Q_{k_j}}}{z_{Cj}^{Q_{k_j}}} & -f_y^C \frac{y_{Cj}^{Q_{k_j}}}{z_{Cj}^{Q_{k_j}}} \end{bmatrix}^T \tag{28}$$

Note that here, $f_x^C$ and $f_y^C$ denote the focal distance of the imaging device 130 in the x-axial direction and the y-axial direction, respectively, and are to be understood to be known values held beforehand. Also, $M_{CM}(s)$ is a modeling conversion matrix (a matrix for converting coordinates in the marker coordinate system into coordinates in the first-person view camera coordinate system) determined by s, and is defined by Expression (27). Note that the product of the matrix at the right side of Expression (27) ($M_{BM}(s) \cdot M_{BM}^{-1} \cdot M_{WB}^{-1}$) represents the position and orientation ($M_{WC}^{-1}$) of the imaging device in the world coordinate system determined by s and $M_{BMj}$.

In step S6090, the calibration information calculating unit 580 calculates the error $$\Delta u_j^{Qkj}$$

between the actual image coordinates $$u_j^{Qkj}$$

of first-person view markers $Q_{kj}$ contained in each data set in the data list L and the corresponding image coordinates logical value $u_j^{Qkj*}$, for all j's, using Expression 29.

$$\Delta u_j^{Q_{k_j}} = u_j^{Q_{k_j}} - u_j^{Q_{k_j}'}, \tag{29}$$

In step S6100, the calibration information calculating unit 580 calculates the image Jacobian matrix $$J_{us}^{Qkjs}(=\partial u_j^{Qkj}/\partial s)$$

regarding the state vector s (i.e., a 2-row×6-column Jacobian matrix having for the components thereof the solutions obtained by partial differentiation of the function $F_j(\ )$ in Expression 28 with the components of the state vector s), for all j's. Specifically, a 2-row×3-column Jacobian matrix $$J_{u_j C_j}^{O_{kj}}(= \partial u_j^{O_{kj}} / \partial x_{C_j}^{O_{kj}})$$

having for the components thereof the solutions obtained by partial differentiation of the right side of Expression 28 with the components of the position vector $$x_{C_j}^{O_{kj}},$$

and a 3-row×6-column Jacobian matrix $$J_{x C_j}^{O_{kj} s}(= \partial x_{C_j}^{O_{kj}} / \partial s)$$

having for the components thereof the solutions obtained by partial differentiation of the right side of Expression 29 with the components of the state vector s, are calculated, and $$J_{u_j}^{O_{kj} s}$$

is calculated using Expression 30.

$$J_{u_j s}^{O_{k_j}} = J_{u_j x_{C_j}}^{O_{k_j}} \cdot J_{x_{C_j} s}^{O_{k_j}} \tag{30}$$

In step S6110, the calibration information calculating unit 580 calculates a correction value Δs based on the error $$\Delta u_j^{O_{kj}}$$

and the Jacobian matrices $$J_{u_j}^{Q_k s}$$

calculated above for all j's. Specifically, an error vector U of a 2J dimension vector vertically giving errors $$\Delta u_j^{O_{kj}}$$

for all j's and a 2J row×6 column matrix vertically giving the Jacobian matrices $$U_{u_j}^{Q_k s}$$

are created, and Δs is calculated with Expression 24 using the pseudo-inverse matrix $\Phi^+$ of $\Phi$. Now, Δs is a six-dimensional vector, so Δs can be obtained as long as 2J is six or greater, i.e., as long as J is three or greater. Note that $\Phi^+$ can be obtained by $\Phi^+=(\Phi^T\Phi)^{-1}\Phi^T$, or by other methods.

In step S6120, the calibration information calculating unit 580 uses the correction value Δs calculated in step S6110 to correct the state vector s representing the position and orientation of the marker coordinates in the first-person view camera coordinates system using Expression 25, and takes the obtained value as a new s.

$$s+\Delta s \rightarrow s \tag{25}$$

In step S6130, the calibration information calculating unit 580 determines whether or not convergence of the calculation has been achieved, using some sort of determination standard, such as whether the error vector U is smaller than a predetermined threshold value, or whether the correction value Δs is smaller than a predetermined threshold value. In the event that convergence is determined not to have been achieved, the post-correction state vector s is used to repeat the processing from step S6080 on.

Upon determination in step S6130 that convergence of the calculation has been achieved, in step S6140 the calibration information calculating unit 580 outputs the obtained state vector s as a parameter indicating the position of the marker coordinate system in the first-person view camera coordinate system. The output format at this time may be s itself, or may be an arrangement in which the position component of s is represented with a three-value vector and the orientation component is represented with a Euler angle or rotating matrix, or may be a coordinate conversion matrix $M_{CM}$ generated from s.

Finally, in step S6150, determination is made regarding whether or not to end the calibration processing. In the event that the operator instructs the marker calibration device 500 to end the calibration processing, the processing is ended, and in the event that the instructor instructs continued calibration processing (i.e., recalibration), the flow returns to step S6010 and awaits input of a data obtaining command.

Thus, the position or position and orientation of markers, provided on an imaging device, as to the imaging device, can be easily and accurately obtained.

<Modification 3-1>

Now, while the present embodiment has been described as outputting the position and orientation of the marker coordinate system in the first-person camera coordinate system as calibration information, an arrangement may be made in which the position of each bird's-eye view marker $P_k$ is calculated in the first-person camera coordinate system and output as calibration system.

<Modification 3-2>

While the present embodiment uses the steepest descent method shown in Expression 26 for calculating the correction value of the state vector, calculation of the correction value does not always need to be obtained with the steepest descent method. For example, this may be obtained with the LM method (Levenberg-Marquardt method) which is a known iterative solving method of linear equations, statistical techniques such as M-estimation which is a known robust estimation technique may be combined therewith, or any other numerical value calculating technique may be applied without detracting from the essence of the present invention.

<Modification 3-3>

Further, while the present embodiment has been described as using a square marker for the bird's-eye view markers, the type of marker is unrestricted so long a marker group is realized wherein the position of each marker in the marker coordinate system is known. For example, a set of multiple circular markers such as used with the first embodiment may be used, or, multiple types of markers may coexist. Moreover, calibration can be similarly performed even in cases of having multiple marker coordinate systems, by performing the above-described processing for each of the marker coordinate systems individually, or by performing the above-described processing for each of the marker coordinates systems in parallel.

<Modification 3-4>

Also, while the present embodiment uses markers to yield two-dimensional coordinates on an image as first-person view markers, linear features or geometrical features may be used as reference markers for evaluation. For example, in the event of using linear features, an arrangement may be made in which correction values can be calculated under the same framework as the above-described embodiment, by taking the distance from a point of origin of a straight line as an error evaluation reference, creating an error vector U with an error Δd calculated from an estimated value d' from the detection value d and state vector s from the image, and creating a matrix Φ with a 1-row×4-column Jacobian matrix $J_{ds}$ (=∂d/∂s) having as the components thereof the solutions obtained by partial differentiation of the calculation expression for d' with the components of the state vector s. Note that the calculation expression for d' is disclosed in D. G. Lowe: Fitting parameterized three-dimensional models to images, IEEE Transactions on PAMI, Vol. 13, No. 5, pp. 441-450, 1991, and in Fujii, Kanbara, Iwasa, Takemura, Yokoya: Positioning by stereo camera with concomitant use of gyro sensor for expanded reality, Institute of Electronics, Information and Communication Engineers PRMU 99-192 (Technical Report of IEICE vol. 99, No. 574, pp. 1-8), 1999, and that the position and orientation of the imaging device can be readily obtained since the position and orientation of the imaging device are obtained as a function of s (the product of the three matrices to the right in Expression 29). Also, these features can be used in a concomitant manner by accumulating errors and image Jacobians obtained from the line features and point features and other markers.

Fourth Embodiment

With the marker calibration device according to the present embodiment, calibration of multiple markers provided upon an object is performed by photographing the object with a movable imaging device having a 6-degree-of-freedom orientation sensor. In the first and second embodiments, only the position of the markers or the position and orientation of the markers were used as unknown parameters, but with the present embodiment, the position and orientation of the camera as to the objects is also handled as an unknown parameter, as well as the position of the markers or the position and orientation of the markers.

With the present embodiment, the markers are made up of a group of three or more points not on the same straight line. Let us say that the relative positions of the multiple points making up the markers are known, i.e., that the positions of the points making up the markers on the marker coordinate system stipulated regarding each of the markers is known. With the present embodiment, in the event that multiple markers are provided on the object, the position and orientation of the marker coordinate system stipulated regarding each of the markers with the object as a reference, i.e., as to the object coordinate system, is obtained as calibration information.

Figure 8:
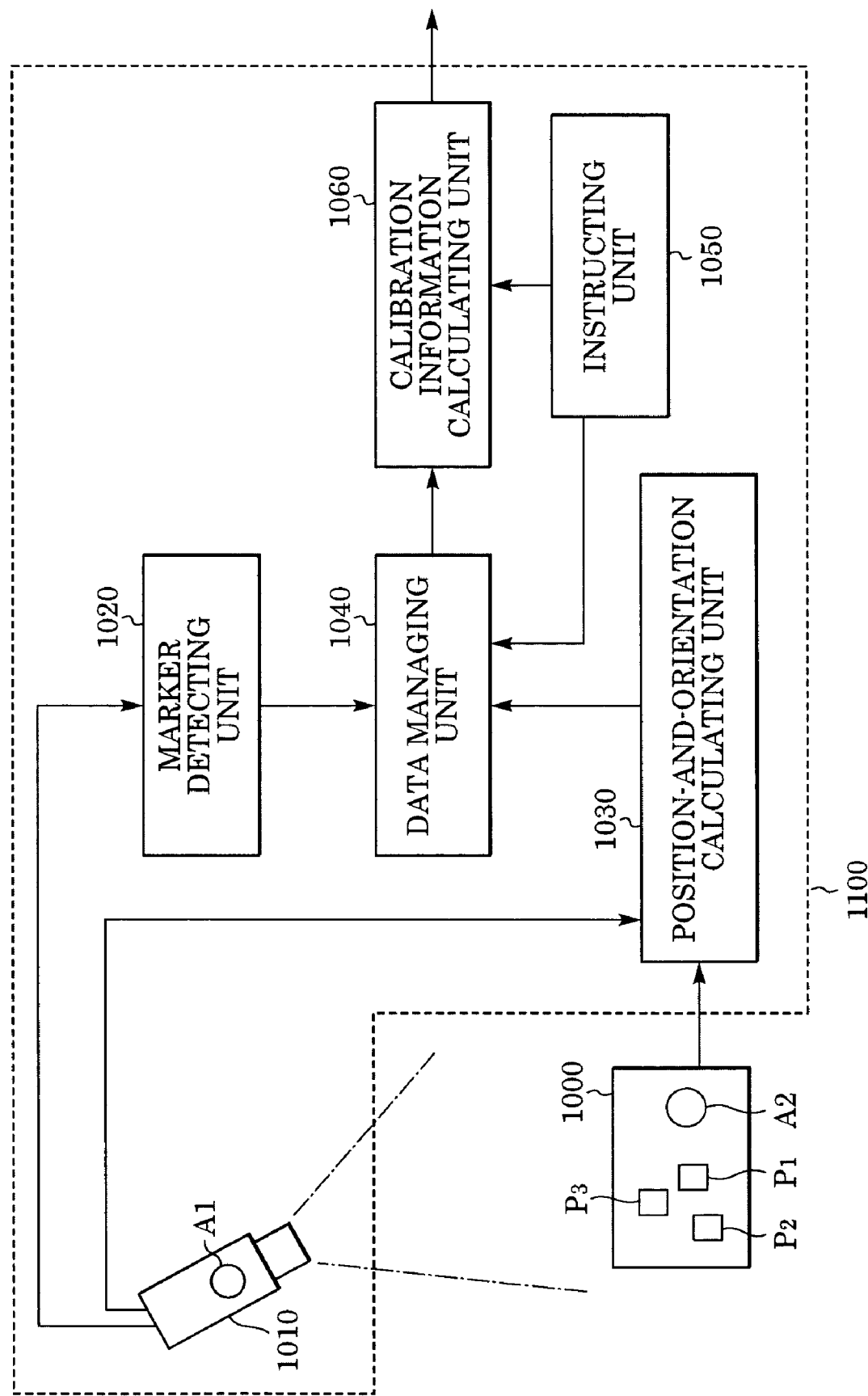
FIG. 8 is a diagram illustrating a schematic configuration of the marker calibration device according to a fourth embodiment.

FIG. 8 is a diagram illustrating an exemplary configuration of a marker calibration device 1100 according to the present embodiment. As shown in FIG. 8, the marker calibration device 1100 includes a marker detecting unit 1020, a position-and-orientation calculating unit 1030, an instructing unit 1050, a data managing unit 1040, and a calibration information calculating unit 1060, and is connected to the object 1000 to which the markers have been provided.

A 6-degree-of-freedom sensor A2 is mounted to the object 1000, so as to enable measurement of the position and orientation of the object as to the world coordinate system. The 6-degree-of-freedom sensor A2 is connected to the position-and-orientation calculating unit 1030. Also, a 6-degree-of-freedom sensor A1 is mounted to the imaging device 1010, so as to enable measurement of the position and orientation of the camera making up the imaging unit 1010 as to the world coordinate system. The 6-degree-of-freedom sensor A1 is connected to the position-and-orientation calculating unit 1030.

Now, multiple markers based on the above definition are provided upon the object 1000. The markers on the object 1000 are represented by $P_k$ (wherein k=1 up to $K_0$), $K_0$ being the number of markers to be calibrated on the object 1000. The markers $P_k$ are also made up of points $p^{ki}$ ((k=1 up to $K_0$), and (i=1 up to $N_k$)), where $N_k$ represents the total number of points making up the markers $P_k$.

As mentioned earlier, the positions of the points making up the markers on the object within the marker coordinate system are known, but the position and orientation thereof on the object coordinate system (a coordinate system in which one point is defined as a point of origin, and three orthogonal axes are defined each as the X-axis, Y-axis, and Z-axis) is unknown. Now, three or more points with known positions in the object coordinate system that are not on the same straight line are provided on the object as reference markers for stipulating the object coordinate system. All reference markers need to be observed within the same image as the other markers to be calibrated, by the imaging unit 1010 which obtains the marker calibration data. Also, any format is permissible for the markers $P_k$ as long as image coordinates of a projected image on the taken image can be detected, and as long as the markers are discernible one from another and the points making up the markers are discernible.

The imaging unit 1010 photographs the markers placed on the object from various positions and directions that taken images are input to the marker detecting unit 1020.

The marker detecting unit 1020 inputs the first-person view image from the imaging device 1010, and detects the image coordinates of the points making up the markers $P_k$ taken in the input image. The marker detecting unit 1020 further outputs the image coordinates $u^{Pkni}$ of the points $p^{kni}$ making up the detected markers $P_{kn}$, and the identifier thereof $k_n$ to the data managing unit 1040. Here, n (n=1 up through M) represents an index for each of the detected markers, and M represents the total number of detected markers. With the case shown in FIG. 8 for example, a square marker with identifiers 1, 2, and 3 is photographed, where M=3, so the identifiers $k_1$=1, $k_2$=2, and $k_3$=3, and the corresponding image coordinates $u^{Pk1i}$, $u^{Pk2i}$, and $u^{Pk3i}$ (where i=1, 2, 3, 4) are output.

As with the first embodiment, the position-and-orientation calculating unit 1030 calculates the position and orientation of the camera in the object coordinate system, from the position and orientation of the camera and object in the real world coordinate system, obtained from the 6-degree-of-freedom sensor A1 mounted to the camera and the 6-degree-of-freedom sensor A2 mounted to the object. The position and orientation of the camera in the world coordinate system thus calculated is output to the data managing unit 1040 in accordance with a request from the data managing unit 1040.

Also, the position-and-orientation calculating unit 1030 internally represents the position and orientation of the camera in the object coordinate system as the three-valued vector $[xyz]^T$ and $[\xi\psi\zeta]^T$ respectively. While there are various methods for representing orientation with three values, in this case, this is represented by a three-valued vector in which the rotational angle is defined by the size of the vector and the rotational direction is defined by the direction of the vector. Here, the position and orientation are respectively represented by the six-dimensional vector $[xyz\xi\psi\zeta]^T$ In the event that a data obtaining command is input from an operator (not shown), the instructing unit 1050 transmits an "obtain data" instruction to the data managing unit 1040, and in the event that a calibration information calculation command is input, transmits a "calibration information calculation" instruction to the calibration information calculating unit 1060.

Upon the data managing unit 1040 receiving an "obtain data" instruction from the instructing unit 1050, the position and orientation of the camera in the object coordinate system is input from the position-and-orientation calculating unit 1030, the image coordinates of the bird's-eye view markers and the identifiers thereof are input from the marker detecting unit 1020, and the set of "position and orientation of camera in object coordinate system, image coordinates of marker, and identifier of marker" is added to and held in a single data list. Now, the position and orientation of the camera in the object coordinate system input from the position-and-orientation calculating unit 1030 is data obtained at the same time as the time of photographing the image from which the image coordinates of the bird's-eye view markers have been detected, input from the marker detecting unit 1020. Also, the data managing unit 1040 outputs a data list for each bird's-eye view marker generated to the calibration information calculating unit 1060, in response to a request from the calibration information calculating unit 1060.

Upon the calibration information calculating unit 1060 receiving a "calibration information calculation" from the instructing unit 1050, a data list is input for the data managing unit 1040, calibration processing is performed based thereupon, and calibration information obtained as the result thereof (i.e., the position and orientation of the marker coordinates in object coordinate system) is output.

FIG. 9 is a flowchart illustrating processing performed at the time of the calibration device obtaining calibration information according to the present embodiment. Program code according to the flowchart is stored in memory within the device according to the present embodiment, such as RAM, ROM, or the like (not shown), which is then read out by a CPU (not shown) and executed.

In step S9010, the instructing unit 1050 determines whether or not a data obtaining command has been input from the operator. The operator inputs a data obtaining command upon the object 1000 being placed at a position for obtaining marker calibration data. In the event that a data obtaining command has been input, the instructing unit 1050 advances the processing to step S9020.

In step S9020, the data managing unit 1040 inputs the position and orientation $t_{oc}=[x_{oc}y_{oc}z_{oc}\xi_{oc}\psi_{oc}\zeta_{oc}]^T$ of the camera in the object coordinate system, from the position-and-orientation calculating unit 1030. The position-and-orientation calculating unit 1030 continuously calculates $t_{oc}$. With the conversion matrix representing the position and orientation of the camera in the world coordinate system obtained from the measurement results $s_{A1}=[x_{A1C}y_{A1C}z_{A1C}\xi_{A1C}\psi_{A1C}\zeta_{A1C}]^T$ of the 6-degree-of-freedom sensor A1 mounted to the camera as $M_{WC}$ ($S_{A1}$), and the conversion matrix representing the position and orientation of the object in the world coordinate system obtained from the measurement results $S_{A2}=[x_{A2O}y_{A2O}z_{A2O}\xi_{A2O}\psi_{A2O}\zeta_{A2O}]^T$ of the 6-degree-of-freedom sensor A2 mounted to the object as $M_{WO}$, the conversion matrix $M_{oc}$ representing the position and orientation of the camera in the object coordinate system is as represented by Expression 31.

$$M_{OC}=M_{WO}^{-1}(s_{A2})\cdot M_{WC}(s_{A1}) \qquad (31)$$

Separating the translational component and orientation component from the matrix $M_{oc}$ obtained from Expression 33 yields the position and orientation $t_{oc}=[x_{oc}y_{oc}z_{oc}\xi_{oc}\psi_{oc}\zeta_{oc}]^T$ of the imaging device in the object coordinate system.

In step S9030, the data managing unit 1040 inputs, from the marker detecting unit 1020, the image coordinates group $u^{Pkni}$ of the points making up the markers $P_{kn}$ detected by the marker detecting unit 1020 and the identifier $k_n$ thereof. The marker detecting unit 1020 continually performs detection processing of markers with regard to input images, so the processing of this step enables image coordinates of markers to be obtained in the event that the position and orientation of the imaging device is $t_{oc}$. Note that the information input from the marker detecting unit 1020 does not necessarily need to be information relating to all markers, and that information relating to markers detected on the image at that point in time is sufficient.

Next, in step S9040, the data managing unit 1040 adds the input data set as data $D_L$ to the data list DL for all detected markers $P_{kn}$. Specifically, with the $t_{oc}$ input from the position-and-orientation calculating unit 1030 as $t_{ocj}=[x_{ocj}y_{ocj}z_{ocj}\xi_{ocj}\psi_{ocj}\zeta_{ocj}]^T$, the identifier $k_n$ input from the marker detecting unit 1020 as $k_{nj}$, and the $u^{Pkni}$ also input from the marker detecting unit 1020 as $u_L^{Pknji}$, the sets of $[t_{ocj}, u_L^{Pknji}, k_{nj}]$ are registered in the data list DL as L'th data. Note that j (j=1 on up to $N_J$) is an index for each of the images taken, L (L=1 on up to $N_L$), is an index for each of the sets registered in the data list DL, $N_J$ represents the total number of images taken, and $N_L$ represents the total number of sets that have been registered. Thus, data is obtained.

In step S9050, data lists obtained so far by the data managing unit 1040 are subjected to determination regarding whether or not the data list is sufficient for calculating calibration information. In the event of not satisfying the conditions, the flow returns to step S9010, and awaits input of a data obtaining command. On the other hand, in the event of satisfying the conditions for calibration information calculation, the flow proceeds to step S9060. An example of a condition for a data list satisfying the conditions for calibration information calculation is for the data list DL to contain data regarding three or more different reference markers. However, the greater the diversity is in the input data, the higher the precision is of the yielded calibration information, so arrangements may be made in which conditions are set to request a greater amount of data.

Next, in step S9060, determination is made regarding whether or not a calibration information calculation command has been input from the operator. In the event that a calibration information calculation command has been input, the processing advances to step S9070, while in the event that a calibration information calculation command has not been input, the flow returns to step S9010 and awaits input of a data obtaining command.

The calibration information calculating unit 1060 handles the calibration information to be obtained, i.e., the position and orientation of the marker in the object coordinate system, as a six-valued vector, as with the second embodiment. In the following description, this unknown parameter will be described as state vector $s_m = [x_m y_m z_m \xi_m \psi_m \zeta_m]^T$. Also, with the present embodiment, $t_{ocj}$ is described as state vector $s_{cj} = [x_{ocj} y_{ocj} z_{ocj} \xi_{ocj} \psi_{ocj} \zeta_{ocj}]^T$. In step S9070, the calibration information calculating unit 1060 gives the state vectors $s_m$ and $s_{cj}$ suitable respective initial values. As for the initial value of $S_{cj}$, $t_{ocj}$ obtained from sensor output is employed. As for the initial value of $s_m$, the operator may manually input a general value using the instructing unit 1050. With the conversion matrix from the camera coordinate system to the object coordinates system as $M_{OC}$, and the conversion matrix from the object coordinates system to the marker coordinate system mounted on the object as $M_{MO}$, the conversion matrix $M_{MC}$ from the camera coordinate system to the marker coordinate system is obtained as shown in Expression 32.

$$M_{MC} = M_{MO} \cdot M_{OC} \quad (32)$$

In step S9080, the calibration information calculating unit 1060 obtains the calculation value $$u_{1L}^{Pknji'} = [u_{xL}^{Pknji'}, u_{yL}^{Pknji'}]$$

of the image coordinates of the marker $P_{knj}$ for all L's, from each data set $$D_L = [t_{OCj}, u_j^{Pknji}, k_j]$$

(wherein j=1, 2, and on up to $N_J$, and wherein L=1, 2, and on up to $N_L$) in the data list DL and the state vectors $s_m$ and $s_{cj}$. Note that here, the calculated value of the image coordinates of the marker means data for the position (coordinates) in the image at which the point $P_{knj}$, regarding which the position vector $$h_M^{Pknj}$$

in the marker coordinate system having the position and orientation of $s_m$ in the object coordinate system is known, should be visible. Calculation of $$u_L^{Pknji'}$$

is performed based on the function shown in Expression 33.

$$u_L^{P_{k_n j} i'} = F_L(s) \quad (33)$$

The state vector $s = [s_m s_{Cj}]$ represents the position of the marker coordinate system in the object coordinate system.

Specifically, the function $F_L()$ is configured as shown in Expression 34.

$$c_L^{P_{k_n j} i} = \begin{bmatrix} x_{c_L}^{P_{k_n j} i} & y_{c_L}^{P_{k_n j} i} & z_{c_L}^{P_{k_n j} i} & 1 \end{bmatrix}^T \quad (34)$$
$$= M_{OC}^{-1}(s_{cj}) \cdot M_{OM}(s_m^{P_{k_n j}}) \cdot h_M^{P_{k_n j} i}$$

Expression 34 is used for obtaining the position vector $$c_L^{Pknji}$$

of the marker $P_{knj}$ in the camera coordinates at the point of having obtaining an L'th data set (i.e., at the point that the position and orientation of the imaging device 1010 is $t_{ocj}$ in the single data set) from $s_m$, $S_{cj}$, and Expression 35.

$$u_L^{P_{k_n j} i'} = \begin{bmatrix} ux_L^{P_{k_n j} i'} & uy_L^{P_{k_n j} i'} \end{bmatrix} = \begin{bmatrix} -f_x^B \frac{x_{c_L}^{P_{k_n j} i}}{z_{c_L}^{P_{k_n j} i}} & -f_y^B \frac{y_{c_L}^{P_{k_n j} i}}{z_{c_L}^{P_{k_n j} i}} \end{bmatrix}^T \quad (35)$$

Expression 35 is used for obtaining the coordinates $u_L^{Pknji'}$ of the marker $P_{knj}$ in the image from $c_L^{Pknji}$. Note that here, $f_x^B$ and $f_y^B$ denote the focal distance of the camera 1010 in the x-axial direction and the y-axial direction, respectively, and are to be understood to be known values held beforehand. Also, $M_{OM}(s_m^{Pknj})$ is a modeling conversion matrix (a matrix for converting coordinates in the marker coordinate system into coordinates in the object coordinate system) determined by $s_m^{Pknj}$, and $M_{OC}^{-1}(s_{cj})$ is a modeling conversion matrix (a matrix for converting coordinates in the object coordinate system into coordinates in the camera coordinate system) determined by $s_{cj}$. $M_{OM}(s_m^{Pknj})$ is defined by Expression 36.

$$M_{OM}(s_m) = \begin{bmatrix} \frac{\xi_m^2}{\theta^2}(1-\cos\theta) + \cos\theta & \frac{\xi_m \psi_m}{\theta^2}(1-\cos\theta) - \frac{\zeta_m}{\theta}\sin\theta & \frac{\xi_m \zeta_m}{\theta^2}(1-\cos\theta) + \frac{\psi_m}{\theta}\sin\theta & x_m \\ \frac{\psi_m \xi_m}{\theta^2}(1-\cos\theta) + \frac{\zeta_m}{\theta}\sin\theta & \frac{\psi_m^2}{\theta^2}(1-\cos\theta) + \cos\theta & \frac{\psi_m \zeta_m}{\theta^2}(1-\cos\theta) - \frac{\xi_m}{\theta}\sin\theta & y_m \\ \frac{\zeta_m \xi_m}{\theta^2}(1-\cos\theta) - \frac{\psi_m}{\theta}\sin\theta & \frac{\zeta_m \psi_m}{\theta^2}(1-\cos\theta) + \frac{\xi_m}{\theta}\sin\theta & \frac{\zeta_m^2}{\theta^2}(1-\cos\theta) + \cos\theta & z_m \\ 0 & 0 & 0 & 1 \end{bmatrix} \quad (36)$$

where $$\theta=\sqrt{\xi_m{}^2+\psi_m{}^2+\zeta_m{}^2}\text{tm} \quad (37)$$

holds and $$M_{OC}^{-1}(s_{Cj}) = \begin{bmatrix} \frac{\xi_{AI}^2}{\theta^2}(1-\cos\theta)+\cos\theta & \frac{\xi_{AI}\psi_{AI}}{\theta^2}(1-\cos\theta)-\frac{\zeta_{AI}}{\theta}\sin\theta & \frac{\xi_{AI}\zeta_{AI}}{\theta^2}(1-\cos\theta)+\frac{\psi_{AI}}{\theta}\sin\theta & x_{AI} \\ \frac{\psi_{AI}\xi_{AI}}{\theta^2}(1-\cos\theta)+\frac{\zeta_{AI}}{\theta}\sin\theta & \frac{\psi_{AI}^2}{\theta^2}(1-\cos\theta)+\cos\theta & \frac{\psi_{AI}\zeta_{AI}}{\theta^2}(1-\cos\theta)-\frac{\xi_{AI}}{\theta}\sin\theta & y_{AI} \\ \frac{\zeta_{AI}\xi_{A2}}{\theta^2}(1-\cos\theta)-\frac{\psi_{AI}}{\theta}\sin\theta & \frac{\zeta_{AI}\psi_{AI}}{\theta^2}(1-\cos\theta)+\frac{\xi_{AI}}{\theta}\sin\theta & \frac{\zeta_{AI}^2}{\theta^2}(1-\cos\theta)+\cos\theta & z_{AI} \\ 0 & 0 & 0 & 1 \end{bmatrix} \quad (38)$$

where $$\theta=\sqrt{\xi_{A1}{}^2+\psi_{A1}{}^2+\zeta_{A1}{}^2} \quad (39)$$

holds.

In step S9090, the calibration information calculating unit 1060 calculates the error $$\Delta u_L^{Pknji}$$

between the actual image coordinates $$u_L^{Pknji}$$

of the markers $P_{knj}$ contained in each data set in the data list DL and the corresponding image coordinates logical value $$u_L^{Pknji\prime},$$

for all L's, using Expression 40.

$$\Delta u_l^{P_{k_n}ji} = u_l^{P_{k_n}ji} - u_l^{P_{k_n}ji\prime} \quad (40)$$

In step S9100, the calibration information calculating unit 1060 calculates the image Jacobian matrix $$J_{uL}^{Pknji}{}_s \; (=\partial u_L^{Pknji}/\partial s)$$

regarding the state vector $s=[S_m S_{cj}]$ (i.e., a $(2\times N_L)$ row$\times$(6$\times$ $K_o$+6$\times K_{NJ}$) column Jacobian matrix having for the components thereof the solutions obtained by partial differentiation of the function $F_j(\;)$ in Expression 33 with the components of the state vectors $s_m$, $s_{cj}$, for all L's. Here, $N_L$ represents the total number of all detected markers, $K_o$ is the total number of markers to be calibrated, and $K_{NJ}$ is the number of images taken.

In step S9110, the calibration information calculating unit 1060 calculates a correction value $\Delta s$ of s based on the error $\Delta u_L^{Pknji}$ and the Jacobian matrices $J_{uL}^{Pknji}{}_s$ calculated above for all L's. Specifically, an error vector of a $2N_L$ dimension vector vertically giving errors $\Delta u_L^{Pkndji}$ for all L's as shown in Expression 41.

$$U = \begin{bmatrix} \Delta u_L^{P_{k_1}l^1} \\ \vdots \\ \Delta u_L^{P_{k_n}ji} \\ \vdots \\ \Delta u_{N_L}^{P_{k_N N_J}N_k} \end{bmatrix} \quad (41)$$

A $(2\times N_L)$ row$\times$($6\times K_o$+$6\times K_{NJ}$) column matrix vertically giving the Jacobian matrices $J_{uL}^{Pknji}{}_s$ as shown in Expression 42 is also created.

$$\Phi = \begin{bmatrix} J_{u_l s}^{P_{k_1}1} \\ \vdots \\ J_{u_l s}^{P_{k_n}ji} \\ \vdots \\ J_{u_{N_L} s}^{P_{k_N N_J}i} \end{bmatrix} \quad (42)$$

$\Delta s$ is calculated using Expression 43 using the pseudo-inverse matrix $\Phi^+$ of $\phi$ as shown in Expression 43.

$$\Delta s=\Phi^+ U \quad (43)$$

Now, $\Delta s$ is a ($6\times K_o$+$6\times K_{NJ}$) dimensional vector, so $\Delta s$ can be obtained as long as $2N_L$ is ($6\times K_o$+$6\times K_{NJ}$) or greater. Note that $\Phi^+$ can be obtained by $\Phi^+=(\Phi^T\Phi)^{-1}\Phi^T$, or by other methods.

In step S9120, the calibration information calculating unit 1060 uses the correction value $\Delta s$ calculated in step S9110 to correct the state vector s using Expression 25 (repeated here as Expression 44), and takes the obtained value as a new s. Here, the state vector $s=[s_m s_{cj}]$ is the state vector $s_m$ of the position and orientation of the marker in the object coordinate system, and the state vector $s_{cj}$ of the camera position and orientation in the object coordinate system.

$$s+\Delta s \to s \quad (44)$$

In step S9130, the calibration information calculating unit 1060 determines whether or not convergence of the calculation has been achieved, using some sort of determination standard, such as whether the error vector U is smaller than a predetermined threshold value, or whether the correction value Δs is smaller than a predetermined threshold value. In the event that convergence is determined not to have been achieved, the post-correction state vector s is used to repeat perform of the processing from step S6080.

Upon determination in step S9130 that convergence of the calculation has been achieved, in step S9140 the calibration information calculating unit 1060 outputs, of the obtained state vector s, $s_m$ as calibration information, i.e., as position and orientation of the marker coordinate system in the object coordinate system. The output format at this time may be $s_m$ itself, or may be an arrangement in which the position component of $s_m$ is represented with a three-value vector and the orientation component is represented with a Euler angle or 3×3 rotating matrix, or may be a coordinates conversion matrix $M_{OM}$ generated from $s_m$.

Finally, in step S9150, determination is made regarding whether or not to end the calibration processing. In the event that the operator instructs the marker calibration device 1100 to end the calibration processing, the processing is ended, and in the event that the operator instructs continued calibration processing (i.e., recalibration), the flow returns to step S9010 and awaits input of a data obtaining command.

Thus, the position or the position and orientation of markers, provided on an imaging device, as to the imaging device (i.e. in the object coordinates system), can be easily and accurately obtained.

<Modification 4-1>

Now, while the present embodiment has been described as a configuration in which the imaging unit 1010 is freely movable, an arrangement may be made as with the bird's-eye view camera in the first and second embodiments, such that the imaging unit 1010 is fixed. In this case, the 6-degree-of-freedom sensor A1 is unnecessary, and the position-and-orientation calculating unit 1030 calculates the position and orientation of the imaging unit 1010 in the object coordinate system, based on the position and orientation of the imaging unit 1010 in the world coordinate system held beforehand as a known value, and the position and orientation of the object in the world coordinate system as obtained from the 6-degree-of-freedom sensor A2. With the first and second embodiments, there is the need for the position and orientation of the bird's-eye view camera to be accurately obtained as a known value, but with the present embodiment, the camera position and orientation in the object coordinate system output by the position-and-orientation calculating unit 1030 is corrected, which is advantageous in that input of general position and orientation is sufficient.

Other Embodiments

The present invention can be realized by supplying a storage medium (or recording medium) storing program code of software for carrying out the functions of the above-described embodiments to a system and device, and a computer (or CPU or MPU (micro-processing unit)) of the system or device reading out and executing the program code stored in the storage medium. In this case, the program code itself read out from the storage medium realizes the functions of the above-described embodiments. The present invention is not restricted to cases in which a computer executes the program code that has been read out, and the functions of the above-described embodiments are realized; and cases in which an operating system or the like running on a computer performs part or all of the actual processing, such that the functions of the above-described embodiments are realized.

Further, the invention encompasses arrangements in which the functions of the above-described embodiments are realized by the program code read from the recording medium and written to memory included in a function expansion card inserted to the computer or function expansion unit connected to the computer, following which a CPU or the like provided to the function expansion card or function expansion unit performs part or all of the actual processing, such that the functions of the above-described embodiments are realized.

In the event of applying the present invention to the above-described storage medium, program code corresponding to the earlier-described flowcharts is stored in the storage medium.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-144895 filed May 14, 2004, Japanese Patent Application No. 2004-144784 filed May 14, 2004, Japanese Patent Application No. 2004-320637 filed Nov. 4, 2004, and Japanese Patent Application No. 2005-065356 filed Mar. 9, 2005, which are hereby incorporated by reference herein.

What is claimed is:

1. An information processing method for calculating a position of a marker provided upon an object in an object coordinate system using the object as a reference, the information processing method comprising:

an object position-and-orientation information obtaining step for obtaining position and orientation information of the object;

a first image input step for inputting a first image from a bird's-eye view imaging unit, photographed from a bird's-eye view of the object in a world coordinate system;

a detecting step for detecting the marker from the first image and obtaining a real value of an image coordinate of the detected marker;

an image coordinate calculating step for calculating an ideal value of the image coordinate of the marker based on the position and orientation information of the object in the world coordinate system and a state vector representing the position of the marker in the object coordinate system;

a correction value calculating step for calculating a correction value of the state vector based on a difference between the real value and the ideal value of the image coordinate of the marker; and a marker position calculating step for calculating the position of the marker in the object coordinate system by correcting the state vector representing the position of the marker in the object coordinate system with the correction value.

2. An information processing method according to claim 1, wherein the object has a first-person view photographing unit; and wherein, the object position-and-orientation information obtaining step further comprises:

obtaining a second image photographed with the first-person view photographing unit, extracting markers existing on other than the object from the second image, and obtaining the position and orientation of the first-person view photographing unit based on information relating to the image coordinates of markers extracted from the second image and position information of markers held beforehand.

3. An information processing method according to claim 1, wherein relative positions of a plurality of markers are known.

4. An information processing method according to claim 1, wherein positions of the markers in a marker coordinate system are known; and wherein a conversion parameter is calculated in the marker position calculating step for converting between the coordinate system of the position and orientation information for the object and the marker coordinate system.

5. An information processing method according to claim 1, wherein the relative position and orientation of the object and the bird's-eye view photographing unit are taken as unknown parameters.

6. An information processing method according to claim 5, further comprising calculating of position and orientation of the bird's-eye view photographing unit as to the object.

7. An information processing method according to claim 1, wherein the bird's-eye view photographing unit is fixed.

8. An information processing method according to claim 1, wherein the marker position calculating step further comprises:

an estimating step for estimating information relating to image coordinates of the markers in the image based on estimation values of position of the markers with regard to the object; and a correcting step for correcting the estimation values based on the error between information relating to image coordinates of the markers detected in the detecting step and information relating to image coordinates of the markers estimated in the estimating step.

9. An information processing method according to claim 1, wherein the marker position calculating step calculates the position and orientation of the marker with the object as a reference.

10. An information processing method according to claim 9, wherein the marker position calculating step further comprises:

an estimating step for estimating information relating to image coordinates of the markers in the image based on estimation values of position and orientation of the markers with regard to the object; and a correcting step for correcting the estimation values based on the error between information relating to image coordinates of the markers detected in the detecting step and information relating to image coordinates of the markers estimated in the estimating step.

11. An information processing device for calculating a position of a marker provided upon an object in an object coordinate system using the object as a reference, the device comprising:

an object position-and-orientation obtaining unit adapted to obtain a position and orientation of the object;

an image input unit adapted to input an image from a bird's-eye view of the object;

a detecting unit adapted to detect the marker from the image and obtain a real value of an image coordinate of the detected marker;

an image coordinate calculating unit adapted to calculate an ideal value of the image coordinate of the marker based on the position and orientation information of the object in the world coordinate system and a state vector representing the position of the marker in the object coordinate system;

a correction value calculating unit adapted to calculate a correction value of the state vector based on a difference between the real value and the ideal value of the image coordinate of the marker; and a marker position calculating unit adapted to calculate the position of the marker with in the object coordinate system by correcting the state vector representing the position of the marker in the object coordinate system with the correction value.

12. An information processing device according to claim 11, wherein the marker position calculating unit is adapted to calculate the position and orientation of the marker with the object as a reference.

13. A computer-storage medium having a computer-executable program stored thereon for executing an information processing method for calculating a position of a marker provided upon an object, as to the object, the information processing method comprising:

an object position-and-orientation obtaining step for obtaining a position and orientation of the object in a world coordinate system;

a first image input step for inputting a first image from a bird's-eye view imaging unit, photographed from a bird's-eye view of the object;

a detecting step for detecting the marker from the first image and obtaining a real value of an image coordinate of the detected marker;

an image coordinate calculating step for calculating an ideal value of the image coordinate of the marker based on the position and orientation information of the object in the world coordinate system and a state vector representing the position of the marker in the object coordinate system;

a correction value calculating step for calculating a correction value of the state vector based on a difference between the real value and the ideal value of the image coordinate of the marker; and a marker position calculating step for calculating the position of the marker in the object coordinate system by correcting the state vector representing the position of the marker in the object coordinate system with the correction value.

* * * * *